United States Patent [19]
Ishikawa et al.

[11] Patent Number: 5,241,408
[45] Date of Patent: Aug. 31, 1993

[54] LIQUID CRYSTAL DISPLAY DEVICE WITH COMPENSATION AND LC TWIST ANGLE VARYING IN A NONLINEAR FASHION IN THE THICKNESS DIRECTION

[75] Inventors: Masahito Ishikawa; Junko Hirata; Yuzo Hisatake; Hitoshi Hatoh, all of Kanagawa, Japan

[73] Assignee: Kabushiki Kaisha Toshiba, Kawasaki, Japan

[21] Appl. No.: 830,679

[22] Filed: Feb. 4, 1992

[30] Foreign Application Priority Data

Feb. 7, 1991 [JP] Japan .................................. 3-038044
Jan. 24, 1992 [JP] Japan .................................. 4-010559

[51] Int. Cl.⁵ ...................... G02F 1/133; G02F 1/1335
[52] U.S. Cl. ........................................ 359/53; 359/73
[58] Field of Search ............................. 359/53, 73, 93

[56] References Cited

U.S. PATENT DOCUMENTS

| | | | |
|---|---|---|---|
| 4,844,569 | 7/1989 | Wada et al. | 359/73 |
| 4,904,058 | 2/1990 | Kato et al. | 359/53 |
| 4,952,029 | 8/1990 | Hayashi et al. | 359/53 |
| 5,090,794 | 2/1992 | Hatano et al. | 359/53 |
| 5,126,868 | 6/1992 | Kizaki et al. | 359/53 |
| 5,166,817 | 11/1992 | Ota et al. | 359/73 |
| 5,187,603 | 2/1993 | Bos | 359/73 |

FOREIGN PATENT DOCUMENTS

| | | |
|---|---|---|
| 0312297 | 4/1989 | European Pat. Off. |
| 0390544 | 10/1990 | European Pat. Off. |
| 63-53528 | 10/1988 | Japan . |
| 3-67219 | 3/1991 | Japan . |
| 2065321 | 6/1981 | United Kingdom . |

OTHER PUBLICATIONS

Patent Abstracts of Japan, vol. 13, No. 508, (P-960)(3856), Nov. 15, 1989, and JP 1-206 318, Aug. 18, 1989, Yoshihiro Matsuo et al., "Liquid Crystal Display Device".

Patent Abstracts of Japan, vol. 13, No. 89, (P-836)(3437), Mar. 2, 1989, and JP 63-271 415, Nov. 9, 1988, Chiyoaki Iijima et al., "Liquid Crystal Display Device".

Japanese Journal of Applied Physics/Part 2, vol. 26, No. 11, Nov. 1987, pp. L1784-L1786, Kazunori Katoh et al., "Application of Retardation Compensation; A New Highly Multiplexable Black-White Liquid Crystal Display With Two Supertwisted Nematic Layers".

Primary Examiner—William L. Sikes
Assistant Examiner—Anita Pellman Gross
Attorney, Agent, or Firm—Oblon, Spivak, McClelland, Maier & Neustadt

[57] ABSTRACT

In a liquid crystal display device having a voltage-driven liquid crystal cell sandwiched between two spaced polarizers, the cell comprises a liquid crystal layer having a twisted molecular alignment with no applied voltage and also having an optical rotary power with respect to visible rays. In the vicinity of the cell or in close contact therewith, there is disposed an optically anisotropic layer having an optical rotary power smaller than that of the cell.

5 Claims, 22 Drawing Sheets

LIQUID CRYSTAL DISPLAY DEVICE WITH COMPENSATION AND LC TWIST ANGLE VARYING IN A NONLINEAR FASHION IN THE THICKNESS DIRECTION

BACKGROUND OF THE INVENTION

1. Field of the Invention:

This invention relates to a liquid crystal display device, and more particularly to a liquid crystal display device with improved dependence characteristics of contrast ratios and display colors upon viewing angles.

2. Description of the Prior Art:

Liquid crystal display devices have significant advantages in terms of thin size, light weight and low power consumption. They have been widely used in various products such as a watch, an electronic calculator, a word processor, a personal computer and the like. Most liquid crystal display devices employ twisted nematic liquid crystal. Further, simple matrix type liquid crystal display devices, which have been currently used in personal computers generally have a large display plane (about 10 inch diagonally) and large display capacity (e.g., 640×480 picture elements). Such a liquid crystal display device has a simple configuration that liquid crystal having a twisted (180° or more) molecular alignment is sandwiched by two spaced glass substrates having transparent striped electrodes formed thereon (ST (super twist) mode). In order to realize a multiplex drive with a relatively large number of scanning lines by use of such a simple configuration, a steepness of electrooptical characteristic must be improved. The steepness represents an electrooptical characteristic of a liquid crystal cell when an applied voltage value of the cell is changed above a threshold voltage. The steepness of electrooptical characteristics can be improved by increasing a total twist angle (referred to as a twist angle) of a molecular alignment in liquid crystal. In practice, a twist angle of a liquid crystal display device in the ST mode must be 180° at a minimum. At this twist angle is much larger compared to the twist angle of about 90° for the TN-LCD, LCDs having such twist angle are referred to as "supertwisted" LCD. However, when a twist angle increases to 180° or more, a display shows undesirable colors because of a birefringence phenomenon. To prevent the undesirable colors, there has been disclosed Japanese Patent Publication No. 63-53528 in which an achromatic display image can be realized by inserting a second liquid crystal cell, which serves to perform optical compensation, between one of polarizers and a first liquid crystal cell (which serves to display), the second cell having a molecular alignment twisted in a direction reverse to that of the first cell. This is based on the principle that light including ordinary ray components and extraordinary ray components is changed into elliptically polarized light by the first liquid crystal cell in which a liquid crystal molecular alignment is twisted. Further, the elliptically polarized light is converted into linearly polarized light by the second liquid crystal cell in such a manner that the ordinary ray components and the extraordinary ray components are replaced with each other. Thus, undesirable coloring, which will be caused by a birefringence phenomenon, can be avoided. As a result, an achromatic display image can be realized. In order to accurately convert elliptically polarized light into linearly polarized light, there must be provided the following conditions:

First, the second liquid crystal cell for optical compensation has a retardation value substantially equal to that of the first liquid crystal cell for display. Second, twist directions of the molecular alignments of both the first and second cells are reversed to each other. Third, their molecular alignments, which are in close contact with each other, must intersect orthogonally.

Besides the above-described technique, there have been disclosed various techniques to prevent a display image from being undesirably colored. For example, retardation films are used in place of a second liquid crystal cell. Specifically, several sheets of retardation films are deposited on a first liquid crystal cell so that the deposited films have substantially the same function as a second liquid crystal cell.

As described above, even in the supertwisted device, a satisfactory a chromatic display image can be obtained when appropriate optical compensation has been provided. Further, with a prescribed combination of color filters, a satisfactory color display image, which is more attractive as a product, can also be obtained. However, in a simple-matrix system, display operations are performed by a multiplexed matrix addressing. Thus, as the number of scanning lines increases in order to increase a display capacity, a difference between a voltage value at which light is cut off and a voltage value at which light is transmitted decreases significantly. As a result, a contrast ratio and a response speed of a liquid crystal display device inevitably deteriorates. Further, in a conventional technique, a display image is reversed or completely disappears, or is undesirably colored depending on viewing directions and angles. These phenomena are essentially disadvantageous to realization of a liquid crystal display device with good quality.

In the case of a liquid crystal display device in an active matrix system, switching elements composed of thin-film transistors and diodes are provided at respective picture elements. In this system, a voltage value at which light is cut off and a voltage value at which light is transmitted can be arbitrarily controlled independently of the number of scanning lines. Therefore, steepness of electrooptical characteristics of liquid crystal need not be significantly high, i.e., a twist angle need not be as large as in the case of a liquid crystal display device in the ST mode.

A liquid crystal cell in a TN (twist nematic) mode, whose molecules are in an orientation of a twist angle of 90°, is inferior to a liquid crystal cell in the ST mode in terms of rapidity in electrooptic characteristics. However, a liquid crystal cell in the TN mode utilizes its optical rotatory power as a display principle. Thus, a high-contrast display image can be relatively easily obtained without undesirable coloring. Further, response to voltage in the TN mode is quicker than that in the ST mode. A combination of the active matrix system and the TN mode can realize a liquid crystal display device having a large display capacity, a high-contrast ratio, and quick response to voltage. Moreover, when prescribed color filters are added to the above-described combination, a full-color display image, which is more attractive as a product, can be realized.

However, in this conventional mode, a display image is reversed or completely disappears, or is undesirably colored depending on viewing directions and angles. These phenomena are significantly disadvantageous to realization of a liquid crystal display device of good quality.

To improve such dependence characteristics of a display image upon viewing angles, there has been disclosed Japanese Patent Disclosure No. S62-21423. In this application, a liquid crystal cell and a retardation film, which is a polymer film having optical anisotropy negative in its thickness, are disposed between two spaced polarizers. Further, these has been disclosed Japanese Patent Disclosure No. H3-67219, in which a retardation film is disposed on a liquid crystal cell. This double refraction layer consists of liquid crystal compound (or polymeric liquid crystal) which exhibits a cholesteric liquid crystal phase such that the product of a helical pitch and a refractive index is 400 nm at a maximum. In these references, the consideration has been made only to the case when liquid crystal molecules are aligned perpendicularly to substrates of a liquid crystal cell, but not to the case when liquid crystal molecules are in a twisted alignment, i.e., the case of the TN mode or the ST mode.

The fundamental principle of display operation for the above-described liquid crystal display devices is such that when a voltage is applied to a liquid crystal cell, orientations of liquid crystal molecules therein are changed so as to cause the liquid crystal cell to be optically changed. Thus, if the liquid crystal display device is observed while being inclined to the display surface, the orientations of liquid crystal molecules are observed inaccurately. As a result, a display image is reversed or completely disappears. Particularly in the case of full-color display using prescribed color filters, a display image is significantly deteriorated.

SUMMARY OF THE INVENTION

Accordingly, one object of the present invention is to provide a liquid crystal display device in which dependence characteristics of contrast ratios and display colors upon viewing angles have been improved.

Briefly, in accordance with one aspect of the present invention, there is provided a liquid crystal display device which comprises two polarizers spaced apart from each other; a driving liquid crystal cell disposed between the two polarizers, the cell having two substrates with electrodes and a liquid crystal layer sandwiched therebetween, the liquid crystal forming a molecular twisted alignment with no voltage applied to the electrodes; and at least one optically anisotropic layer having at least one opticaly anisotropic media whose optical axis is continuously-twisted alignment and in substantially perpendicular to a substrate surface of the driving liquid crystal cell, the optically anisotropic layer having optical rotatory power smaller than that of the liquid crystal layer of the driving liquid crystal cell with respect to visible rays.

In accordance with another aspect of the present invention, there is provided a liquid crystal display device in which a retardation value $R_1$ [nm] and a twist angle $T_1$ [deg] of the driving liquid crystal and a retardation value $R_2$ [nm] and a twist angle $T_2$ [deg] of the optically anisotropic layer have the following relationship:

$$(R_1/T_1) > (R_2/T_2).$$

In accordance with another aspect of the present invention, there is provided a liquid crystal display device in which a value obtained by multiplying $\Delta n$ by $P$ is smaller than a value in a range of visible ray wavelengths, where $\Delta n$ represents refractive-index anisotropy and $P$ represents a helical pitch, both of the optically anisotropic material of the optically anisotropic layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Hereinafter, embodiments according to the present invention will be described which are capable of achieving desirable contrast ratios and which can be arbitrarily determined to be in particular orientations and viewing angles.

In a liquid crystal display device of a TN mode or a ST mode, a polarization state of light transmitted through the liquid crystal display device differs depending on incidences (i.e., whether or not an incident angle is a right angle) with respect to a display surface of the liquid crystal display device. The difference of polarization states has direct effects upon occurrence of undesirable phenomena such as inversion and coloring of a display image. As a viewing angle with respect to the normal line on the display surface of the liquid crystal display device increases, particular regions having such undesirable phenomena increase. Particularly, these phenomena can be significantly observed at respective picture elements when a voltage is applied to a driving liquid crystal cell.

Figure 2:
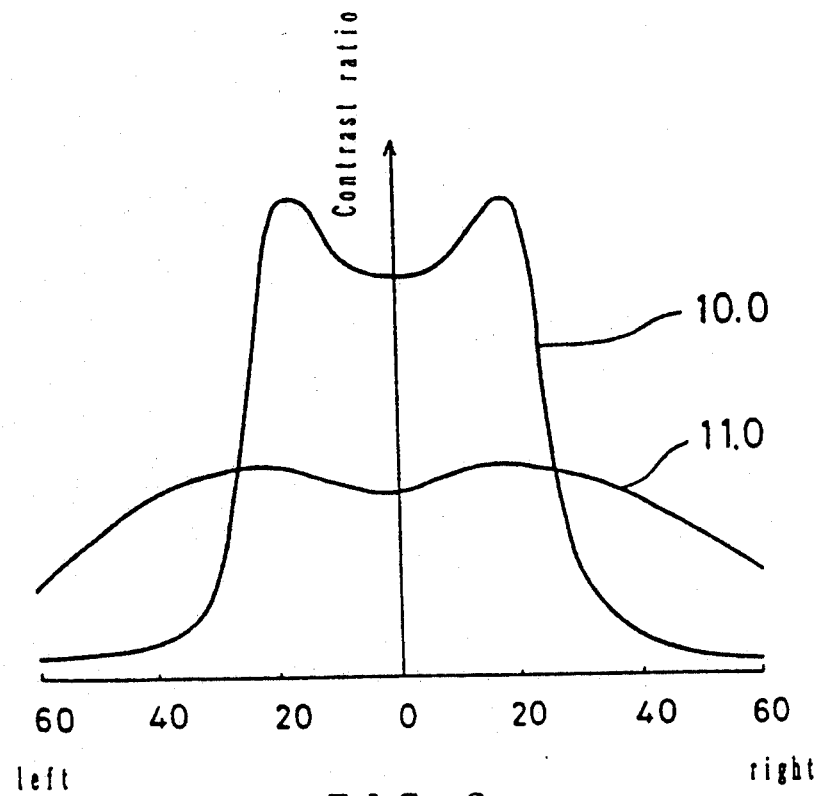
FIG. 2 is a graph illustrating dependence characteristics of contrast ratios upon viewing angles in the cases of a conventional normally-open mode and a conventional normally-close mode.

FIG. 2 shows dependence characteristics of contrast ratios upon viewing angles in the case of a conventional TN-type liquid crystal display device. In the figure, the viewing angles are in a range of 60° (left) to 60° (right) through 0° from a normal on the display surface of the liquid crystal display device.

Further, the curve (10.0) indicates the case of a normally-open mode, and the curve (11.0) indicates the case of a normally-close mode. The normally-open mode is such that a bright state is obtained when no voltage is applied to the driving liquid crystal cell, and a dark state is obtained when a voltage is applied to the driving liquid crystal cell. To the contrary, the normally-close mode is such that a dark state is obtained with no applied voltage, and a bright state is obtained with an applied voltage. As can be seen from FIG. 2, contrast ratios in the case of the normally-close mode are less dependent upon viewing angles than those in the case of the normally-open mode. A contrast ratio is a value obtained by dividing an intensity of a bright state by an intensity of a dark state. Therefore, a contrast ratio is changed depending on an intensity of a dark state.

Figure 3:
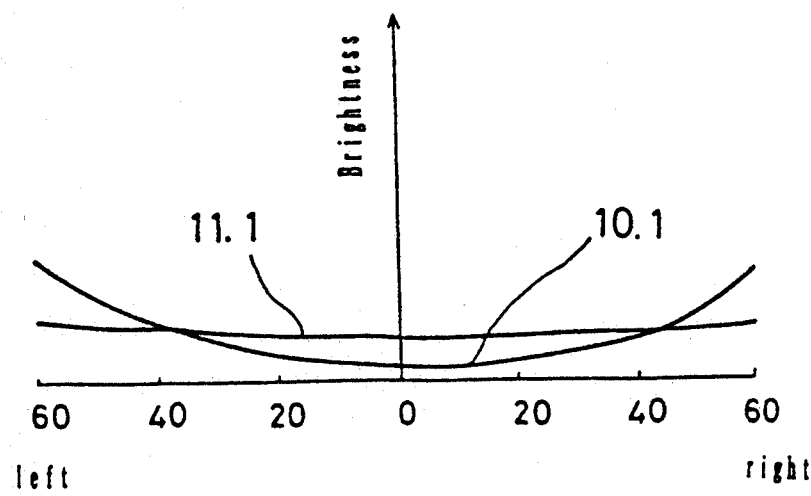
FIG. 3 is a graph illustrating dependence characteristics of intensities of dark states upon viewing angles in the cases of a conventional normally-open mode and a conventional normally-close mode.

FIG. 3 shows dependence characteristics of intensities of a dark state upon viewing angles. In FIG. 3, the curve (10.1) indicates the case of a normally-open mode, and the curve (11.1) indicates the case of a normally-close mode. As can be seen from FIG. 3, intensities of a dark state in the case of the normally-close mode are less dependent upon viewing angles than those in the case of the normally-open mode. In other words, contrast ratios in the case of the normally-close mode are less dependent upon viewing angles than those in the case of the normally-open mode.

When a difference between dark states in the normally-open mode and in the normally-close mode is studied, the following phenomena can be considered. Specifically, in the case of the normally-open mode, a voltage is applied to the liquid crystal cell to obtain a dark state. In this case, it can be roughly assumed that liquid crystal molecules are in a perpendicular alignment with respect to the substrate surface of the cell. In the case of the normally-close mode, a dark state can be obtained with no applied voltage. Thus, liquid crystal molecules are in a horizontally twisted alignment with respect to the cell substrate. Therefore, it is understood that the difference of viewing-angle characteristics in these modes is derived from a difference in molecular alignment states of the liquid crystal cells, i.e., viewing-angle characteristics in the perpendicular alignment state are inferior to those in the horizontally twisted alignment state.

Figure 4:
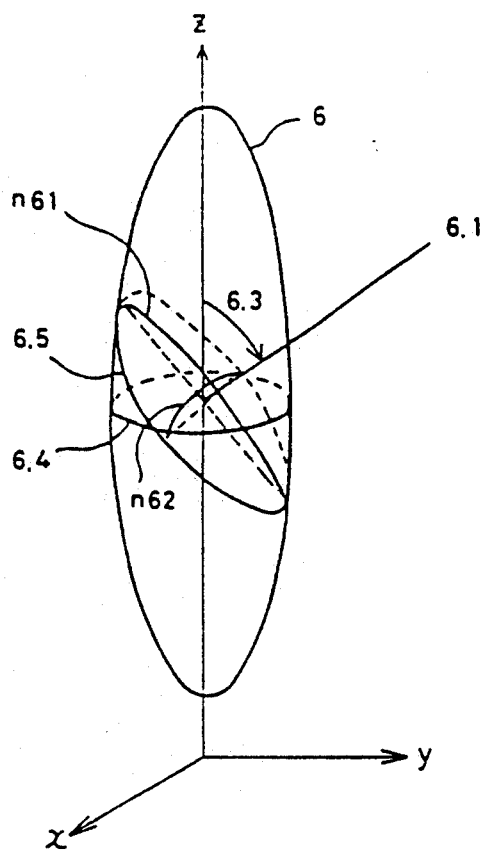
FIG. 4 is a diagram schematically illustrating a index surface of one of liquid crystal molecules aligned perpendicularly.

FIG. 4 shows an index surface which schematically represents a liquid crystal molecule in the perpendicular alignment state.

A z-axis corresponds to a thickness-direction of the liquid crystal cell, and an x-y plane corresponds to a substrate surface of the liquid crystal cell. A birefringence phenomenon can be represented by a shape of a cross-sectional plane formed when an index surface 6 is cut by a plane including a normal which is on the center point of the index surface 6. The formed cross-sectional plane (which is an ellipse in most cases except when a viewing axis (6.1) is accurately on the z-axis) is called a refractive-index shape in a two-dimensional plane. A difference between the lengths of a longitudinal axis and a traverse axis of the refractive-index shape corresponds to a phase difference between an ordinary ray and an extraordinary ray.

Assume that absorption axes of two spaced polarizers (which sandwich a liquid crystal cell) orthogonally intersect each other. In this case, if a phase difference between an ordinary ray and an extraordinary ray is zero, light to be transmitted through the liquid crystal cell is cut off. Further, if a phase difference between an ordinary ray and an extraordinary ray is not zero, light can be transmitted through the liquid crystal cell in accordance with this phase difference and a wavelength of an incident light. In the case of light incident on the liquid crystal cell perpendicularly to the substrate surface thereof (i.e., when the liquid crystal cell is observed from a right front), a refractive-index shape (6.5) in a two-dimensional plane becomes a circle (6.4). Consequently, a phase difference between an ordinary ray and an extraordinary ray becomes zero. In the case of light incident on the liquid crystal cell with an inclined viewing axis (6.1), a refractive-index shape (6.5) becomes an ellipse so that a phase difference between an ordinary ray and an extraordinary ray occurs. A polarization state of light which penetrates through the liquid crystal cell differs depending on a viewing axis (6.1). In order to improve viewing-angle characteristics of the liquid crystal cell, it is important to improve an index surface of the liquid crystal cell with applied voltage.

Figure 7:
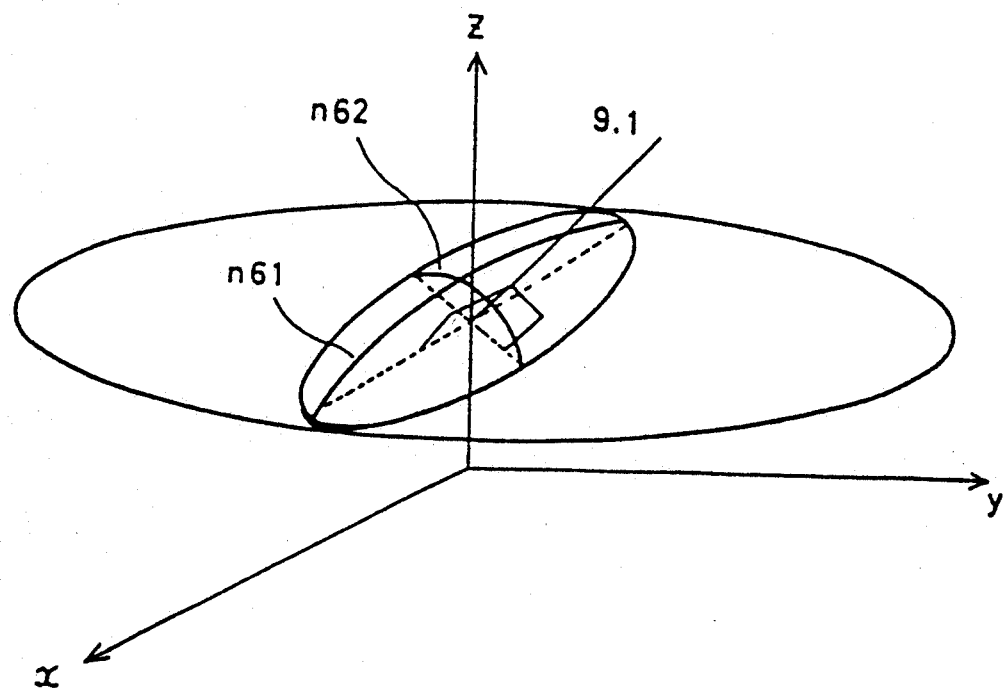
FIG. 7 is a diagram illustrating a index surface for performing optical compensation.

More specifically, in FIG. 4, as a viewing angle (6.3) increases, a refractive-index shape (6.5) increases in a direction of $n_{61}$ as does the amount of transmitted light. It is ideal that a shape of a refractive-index area in a two-dimensional plane stay the same even when a viewing angle was different. This can be substantially realized by performing the optical compensation as follows: A disc-shaped index surface shown in FIG. 7 is disposed on the z-axis of an index surface 6 (i.e., to be disposed at a position adjacent to the upper or lower substrate of the liquid crystal cell). In this configuration, as a viewing angle (6.3) increases, a refractive-index shape (6.5) in a two-demensional plane of the index surface 6 increases. However, at the same time, a refractive-index shape in a longitudinal direction of $n_{62}$ can also be increased. As a result, a synthesized refractive-index shape in a two-dimensional plane becomes a circle. This means that the index surface 6 can be optically compensated. Thus, viewing-angle characteristics can be improved.

In practice, the index surface shown in FIG. 7 can be realized by an optically anisotropic layer, e.g., consisting of an optically anisotropic material, whose optical axis is in a continuously twisted alignment.

In general, a driving liquid crystal cell performs displaying operation by means of, in accordance with an applied voltage, positively changing a polarization direction of light in a range of visible wavelengths (i.e., a range of 380 nm through 750 nm). On the other hand, in the case of an optically anisotropic layer for optical compensation according to the present invention, optical rotatory power occurs depending on optical conditions of the optically anisotropic layer. This is because the optical axis of the optically anisotropic material layer is continuously twisted.

Optical rotatory power represents properties of a medium, the properties being such that as light progresses, in the medium a vibration direction of the light rotates clockwise or counter clockwise about an axis which is a light-progressing direction. Assume that a retardation value of an optically anisotropic layer, whose optical axis is continuously twisted, is constant. In this case, if the optical axis has a long twist pitch, light rotates its polarizing plane in accordance with the twist of the optical axis. However, if the optical axis has a short twist pitch, light cannot follow the twist of the optical axis, and consequently an optical rotatory phenomenon does not occur. When optical rotatory power of an optically anisotropic layer is large, a polarizing plane of light which transmits through the layer is inevitably changed. As a result, a contrast ratio is inevitably decreased. In some cases, a polarizing plane is variously changed by wavelengths of light which penetrate through an optically anisotropic layer, and transmitted light is undesirably colored. Therefore, optical rotatory power with respect to visible rays of an optically anisotropic layer must be smaller than that of a driving liquid crystal cell.

Optical rotatory power significantly depends on wavelengths of light which penetrates through a medium and also on inherent properties of this medium. The amount of optical rotatory power can be expressed by the degree of change in a retardation value of a medium with respect to the change of an optical axis. Therefore, the amount of optical rotatory power of a driving liquid crystal cell can be expressed by the following equation:

$$\Delta n_1 \cdot d_1 / T_1 = R_1 / T_1 \tag{1.1}$$

where $R_1 (=\Delta n_1 \cdot d_1)$ represents a retardation value, $\Delta n_1 (=n_e - n_o)$ represents refractive-index anisotropy, which is a difference between a refractive index $n_o$ with respect to an ordinary ray and a refractive index $n_e$ with respect to an extraordinary ray both of liquid crystal of the driving liquid crystal cell, $d_1$ represents thickness of a liquid crystal layer of the driving liquid crystal cell, and $T_1$ represents a twist angle of a twisted molecular alignment in the liquid crystal layer. Similarly, the amount of optical rotatory power of a viewing-angle compensating optically anisotropic layer can be expressed by the following equation:

$$\Delta n_2 \cdot d_2 / T_2 = R_2 / T_2 \tag{1.2}$$

where $R_2 (=\Delta n_2 \cdot d_2)$ represents a retardation value, $\Delta n_2$ represents refractive-index anisotropy of an optically anisotropic material of the viewing-angle compensating optically anisotropic layer, $d_2$ represents thickness of a deposited optically anisotropic material layer, and $T_2$ represents a total twist angle of the optically anisotropic material layer.

Therefore, the quantitative relationship of optical rotatory power between the viewing-angle comensating optically anisotropic layer and the driving liquid crystal cell can be expressed by the following equation:

$$(R_1/T_1) > (R_2/T_2) \tag{1.3}$$

Transmission of light through an optically anisotropic layer, i.e., an optically anisotropic material, whose optical axis is continuously twisted can be expressed by parameters indicated by the following equation (C. Z. Van Doorn, Physics Letters 42A, 7 (1973)):

$$f = \lambda / (P \times \Delta n) \tag{1.4}$$

where $\lambda$ represents a wavelength (in a range of visible wavelengths) of light in a vacuum, and P represents a helical pitch (P=d/T) of an optical axis.

When $f<<1$, light in an optically anisotropic layer changes its polarizing plane in accordance with a twist angle of an optical axis of the layer, i.e., there exists significant optical rotatory power in the layer. As described above, it is preferable for an optically anisotropic layer to have optical rotatory power less than that of a driving liquid crystal cell. Further, the optically anisotropic layer must satisfy a condition of $f>>1$. Therefore, the following equation must be held for an optically anisotropic layer:

$$P \times \Delta n > \lambda \tag{1.5}$$

(see equation (1.4))

Liquid crystal, which has a very large total twist angle, i.e., a very short helical pitch, is generally called cholesteric liquid crystal. Assume that a value of $n \times p$ (the product of an averaged refractive index n and a helical pitch p) of cholesteric liquid crystal exists in a range of visible wavelengths (shortest wavelength=360 nm through 400 nm, and longest wavelength=760 nm through 830 nm, which differ depending on conditions). In this case, selective reflection occurs (J. L. Fergason; Molecular Crystal. 1. 293. (1966).) This selective reflection is not a phenomenon observed only in cholesteric liquid crystal, but can also be observed in an optically anisotropic layer consisting of an optically anisotropic material whose optical axis is continuously twisted.

When selective reflection occurs in an optically anisotropic layer, a coloring phenomenon occurs therein, and display colors are undesirably changed. Therefore, a value of $n \times p$ (the product of an averaged refractive index n and an optical-axis twist pitch P, both of an anisotropic material layer constituting an optically anisotropic layer) is determined to be out of a range of visible wavelengths so as to prevent an undesirable coloring phenomenon.

Figure 5:
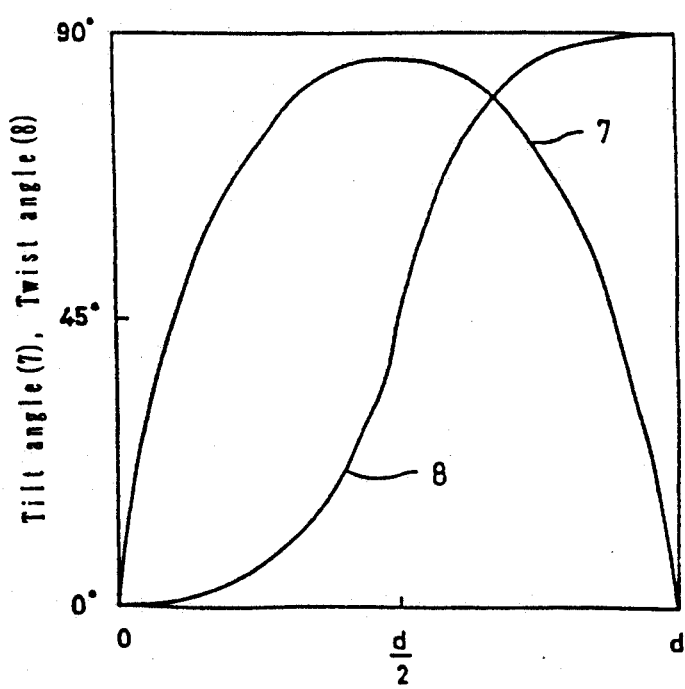
FIG. 5 is a graph for explaining a molecular alignment state in a liquid crystal cell when a voltage is applied to the cell in the case of a TN mode.
Figure 6:
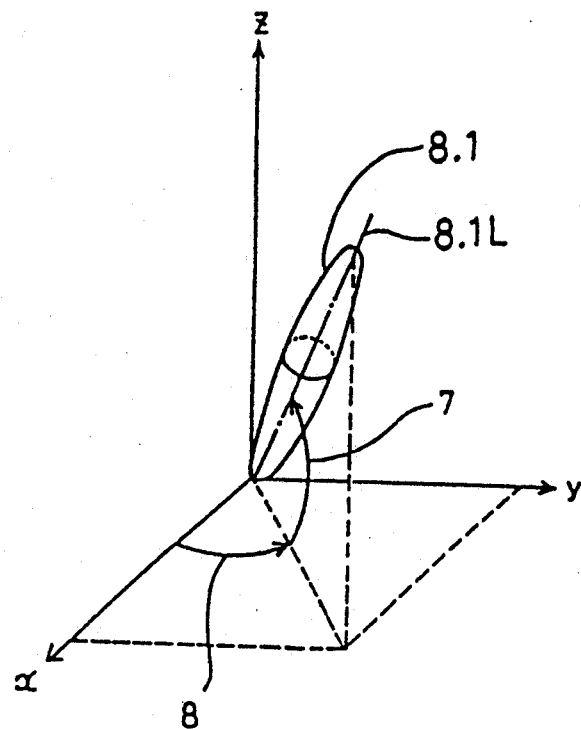
FIG. 6 is a diagram illustrating a coordinate system of the molecular alignment state in the liquid crystal cell of FIG. 5.

Hereinbefore, the principle of viewing-angle expansion or viewing-angle control according to the present invention have been conceptually described. However, in practice, the above-described index surface of the driving liquid crystal cell (when a voltage more than a threshold voltage is applied thereto) is not a simple ellipsoid as shown in FIG. 4. Actual calculations have been made as to a molecular alignment state in a driving liquid crystal cell (with applied voltage to be in a dark state) in the TN mode. The results the calculations are shown in FIG. 5. In FIG. 5, the curve 7 indicates a tilt angle, and the curve 8 indicates a twist angle. In FIG. 6, a tilt angle 7 is an angle of the direction axis (8.1 L) of a liquid crystal molecule (8.1) tilting with respect to an X-Y plane which is a display plane of a liquid crystal cell. Further, in FIG. 6, a twist angle 8 is an angle constituted by an X-axis and an axis obtained by projecting the liquid crystal molecule (8.1) from a Z-axis onto the X-Y plane.

Figure 8A:
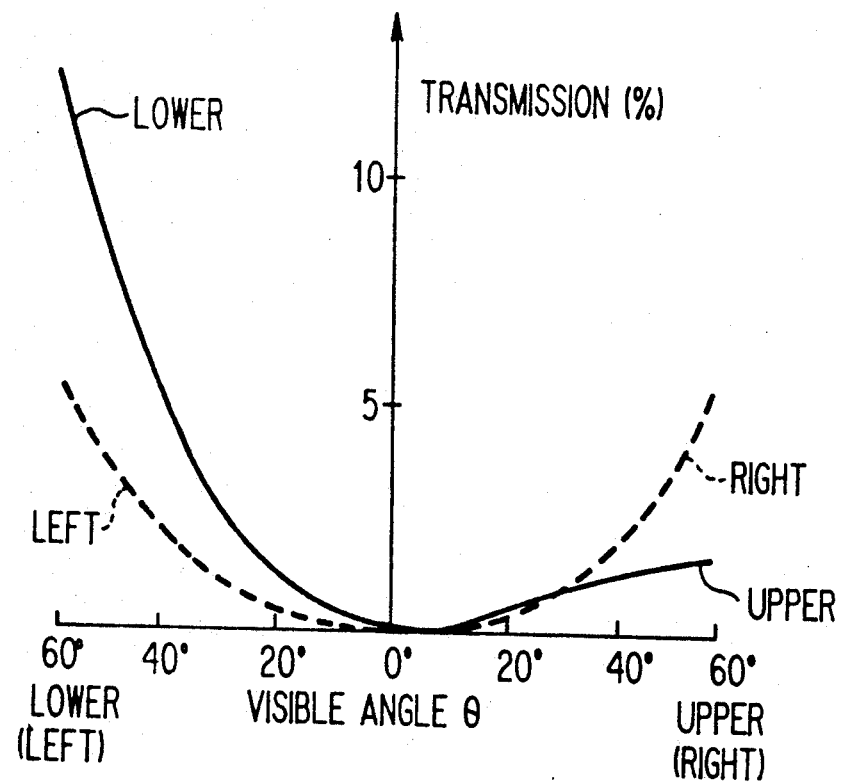
FIG. 8a through FIG. 8e are graphs for explaining viewing-angle characteristics of liquid crystal cell and optically anisotropic layers.
Figure 8B:
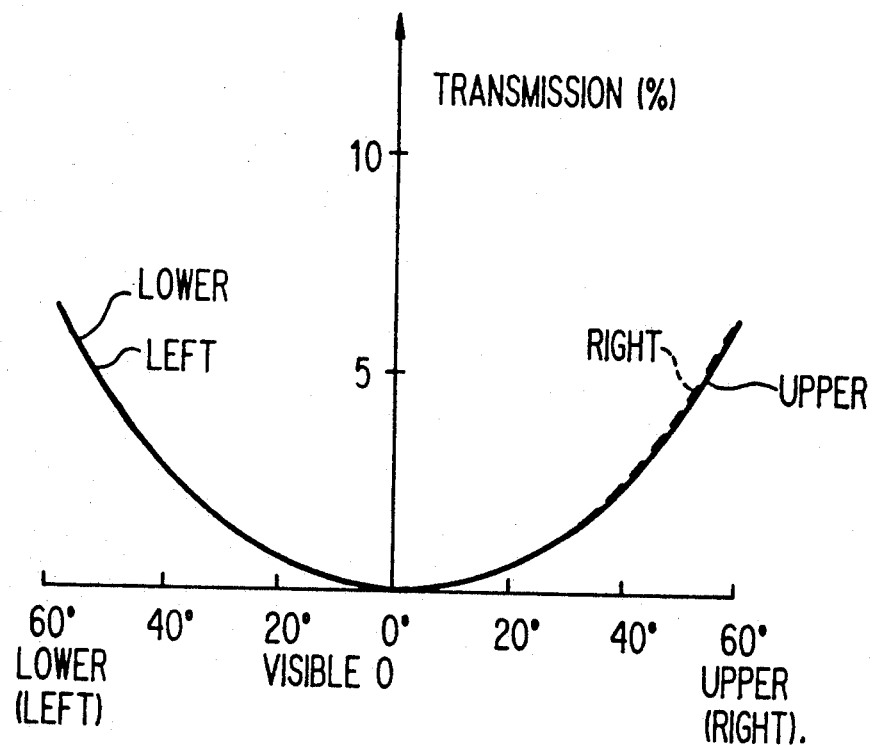

When a voltage is applied to the liquid crystal cell, liquid crystal molecules in the vicinity of the center of the cell tilt by about 90°. However, liquid crystal molecules near the upper and lower surfaces of the cell substrates do not tilt so significantly. This is because the liquid crystal molecules near the surfaces have been affected by an anchoring effect of the substrate surfaces of the cell. Further, the twist angle 8 becomes an S-shaped distribution, as indicated by the curve 8a shown in FIG. 5. As can be seen from FIG. 5, a molecular alignment in the liquid crystal cell with an applied voltage does not become a perfect perpendicular alignment state. This molecular alignment state in the liquid crystal cell has significant effects on viewing-angle characteristics. FIG. 8a is a graph illustrating viewing-angle characteristics of a dark state in a normally-open mode of a TN-LCD (when a voltage more than a threshold voltage is applied thereto). In FIG. 8a, four different curves respectively indicate measurements of transmission of a liquid crystal cell measured at four different direction angles $\phi$, i.e., 0° (right direction), 90° (upper direction), 180° (left direction), and 270° (lower direction) with variation of viewing angles in a range of 0° through 60° (see a coordinate system shown in FIG. 10). As can be seen from FIG. 8a, viewing angle versus transmission curves of upper and lower directions do not coincide with those of left and right directions. Further, transmission of upper and lower directions at the same viewing angles differ significantly. On the other hand, in the case of a liquid crystal cell having perpendicularly aligned molecules, viewing angle versus transmissivity curves of upper and lower directions substantially coincide with those of left and right directions, as shown in FIG. 8b. Thus, in the case of the liquid crystal cell having a twisted molecular alignment with an applied voltage, an index surface of the cell does not become a simple shape as shown in FIG. 4, but becomes a shape obtained by deforming the shape of FIG. 4. This deformation is caused by the inclination of liquid crystal molecules in the vicinity of the center of the liquid crystal cell, and the twisted molecular alignment near the substrate surface of the liquid crystal cell. Therefore, an optically compensating index surface, which is used for a driving liquid crystal cell in a TN mode or in an ST mode, is intentionally deformed into a slightly complicated shape so as to accord with an index surface of the driving liquid crystal cell, as shown in FIG. 7.

Figure 8C:
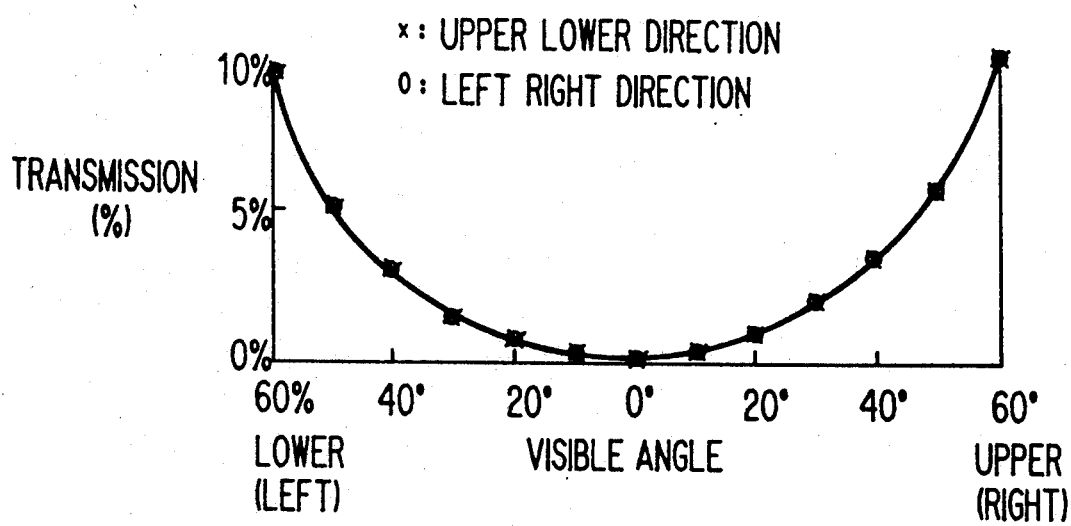
Figure 8D:
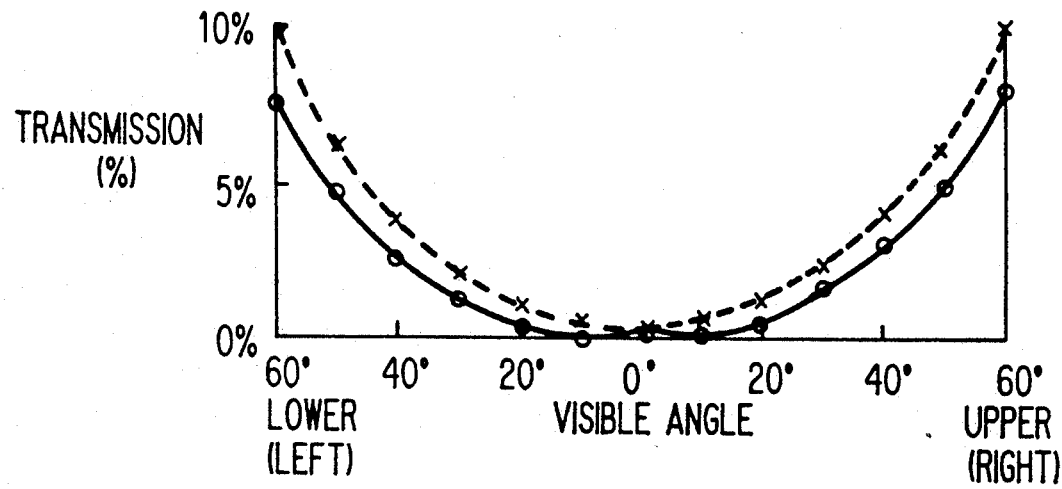
Figure 8E:
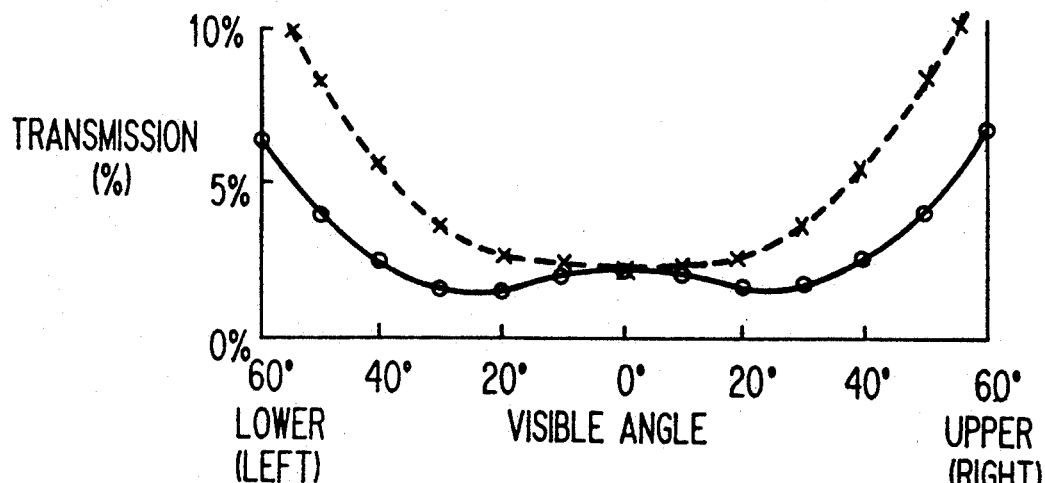

FIGS. 8c through 8e are graphs illustrating viewing-angle characteristics of three different optically anisotropic layers, each being disposed between two spaced polarizers having transmission axes that orthogonally intersect each other. The measurements have been made in the same manner as in the cases shown in FIGS. 8a and 8b. All of the measured optically anisotropic layers are made of chiral nematic liquid crystal, and have liquid crystal layers of 12 $\mu$m thick in common. However, as for a helical pitch and a twist angle are different as follows. Specifically, optical-axis twist pitches are:

0.248 $\mu$m in the case of FIG. 8c,
0.738 $\mu$m in the case of FIG. 8d, and
5.3 $\mu$m in the case of FIG. 8e.

Figure 25:
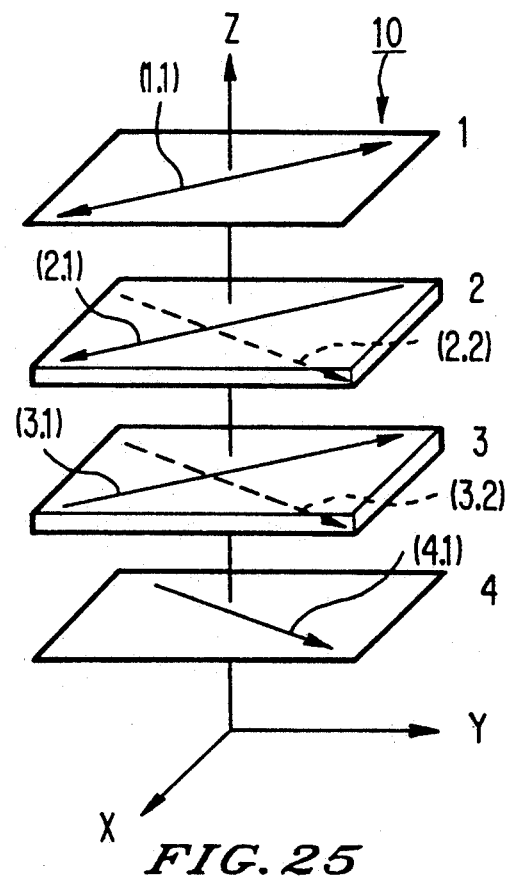
FIG. 25 is an exploded perspective view illustrating a configuration of a liquid crystal display device of an embodiment 13 according to the present invention.

Further, twist angles, when expressed by the number of rotations are:

48,25 rotations in the case of FIG. 8c,
16,25 rotations in the case of FIG. 8d, and
2,25 rotations in the case of FIG. 8e.

In FIGS. 8c through 8e, the broken line with x mark curves indicate the results of measurement in upper and lower directions, and the line with o mark curves indicate the results of measurement in left and right directions, respectively. As can be seen from FIGS. 8c through 8e, when the twist angles are small, transmission of the respective directions differ significantly. Further, when the twist angles are large, transmission of the respective directions coincide with each other. This means that a refractive-index ellipsoid of an optically anisotropic layer becomes a perfect disc-shape when a twist angle is large, but becomes a deformed disc-shape when a twist angle is small.

The advantages of improving viewing-angle characteristics according to the present invention can be obtained in all the cases of FIGS. 8c through 8e. However, as described above, an index surface of a driving liquid crystal cell is deformed when a voltage is applied to the cell. Thus, the advantages of this invention can be obtained more effectively when an index surface of an optically anisotropic layer, which is deposited on a driving liquid crystal cell, is also deformed correspondingly to deformation of a refractive-index ellipsoid of the driving liquid crystal cell. Specifically, it is more preferable to employ optically anisotropic layers having characteristics of FIGS. 8d and 8e, in which the numbers of rotations (representing the twist angles) are relatively smaller. As described above, when the number of rotation in an optically anisotropic layer becomes smaller, a helical pitch P becomes longer. On the other hand, a refractive index n of optically anisotropic layer can be regarded as n = 1.5. Thus, it is more preferable for a value of $n \times P$ to be greater than a value of the longest wavelength in a range of visible wavelengths. Further, the advantages of this invention are changed depending on optical conditions of an optically anisotropic layer such as a retardation value ($\Delta n \cdot d$: the product of refractive-index anisotropy by thickness), the number of rotations, a tilt angle and a rotational direction both of a twisted optical axis, and a direction of an optical axis of optically anisotropic material constituting an optically anisotropic layer. Particularly, as for a rotational direction of an optical axis, the advantages of this invention are changed depending on whether a rotational direction of an optical axis of an optically anisotropic layer and a twisting direction of liquid crystal molecules in a driving liquid crystal cell are equal to each other or reverse to each other. These changes in advantages of this invention will be later described in detail referring to various embodiments.

Hereinbefore, a driving liquid crystal cell in the TN mode has been described as an example. However, the optical comensation technique of this invention is based on the principle of optical anisotropy. Thus, as for a driving liquid crystal cell, the same advantages of this invention as described above can be naturally obtained not only in the case of the TN mode (with a twist angle of about 90°) but also in the case of the ST mode (with a twist angle of 180° or more). Specifically, the advantages of this invention can be obtained in either case as long as a molecular alignment state of a driving liquid crystal cell (when a voltage more than a threshold voltage is applied to the cell) is such that tilt angles of liquid crystal molecules near the substrate surface of the cell and in the vicinity of the center of the cell differ from each other, and twist angles of liquid crystal molecules are aligned in a nonlinear fashion with respect to the thickness of the liquid crystal layer.

Further, the optically anisotropic layer can be realized by depositing retardation films which have been manufactured by extending polymer films so as to produce opto-anisotropy therein. Moreover, the optically anisotropic layer can also be realized by use of a liquid crystal cell having a twisted molecular alignment, or by use of a thin film having a twisted alignment of polymeric liquid crystal. In this case, polymeric liquid crystal is applied to a surface of at least one of upper and lower substrates of a driving liquid crystal cell, so that a satisfactory liquid crystal display device can be easily manufactured. For example, polysiloxane can be used as a main chain, and polymer copolymer liquid crystal having biphenylbenzoate and cholesteril-radical in an appropriate proportion can be used as a side chain.

Figure 9:
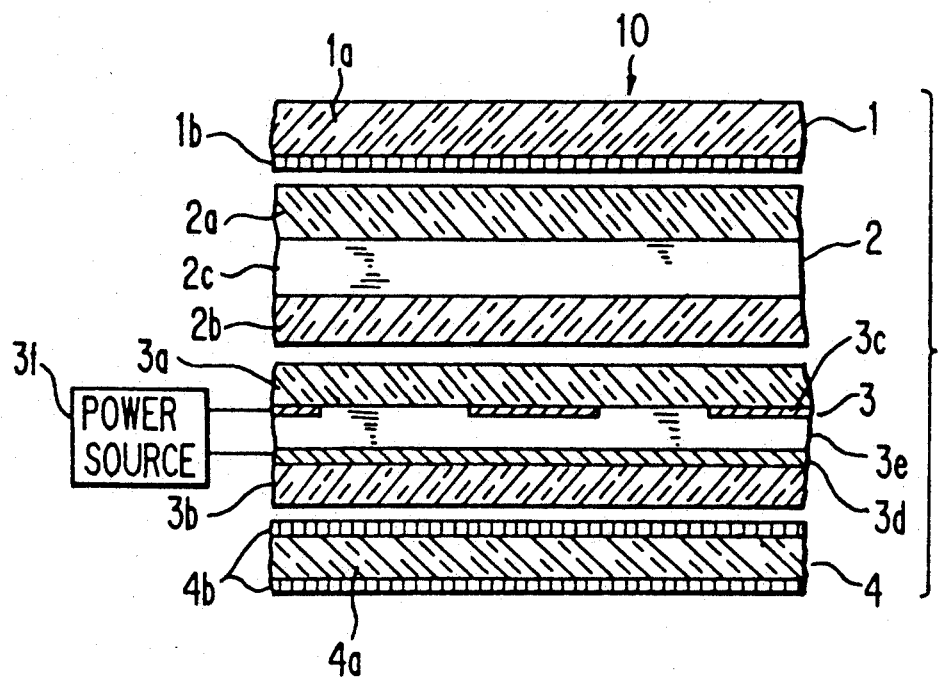
FIG. 9 is a cross-sectional view illustrating a liquid crystal display device of the embodiment 1 according to the present invention.

FIG. 9 is a cross-sectional view illustrating a liquid crystal display device of this embodiment according to the present invention. In FIG. 9, a liquid crystal display device 10 comprises two spaced polarizers 1 and 4 (LLC 2-92-18: manufactured by SANRITZ Co., Ltd.), and a viewing-angle compensating liquid crystal 2 and a driving liquid crystal 3, the cells 2 and 3 being sandwiched between the polarizer 1 and 4. The polarizers 1 comprises a polarizing film 1a adhered to inner sides of two transparent substrates 1b. Similarly, the polarizer 4 comprises a polarizing film 4a adhered to inner sides of two transparent substrates 4b.

Figure 1:
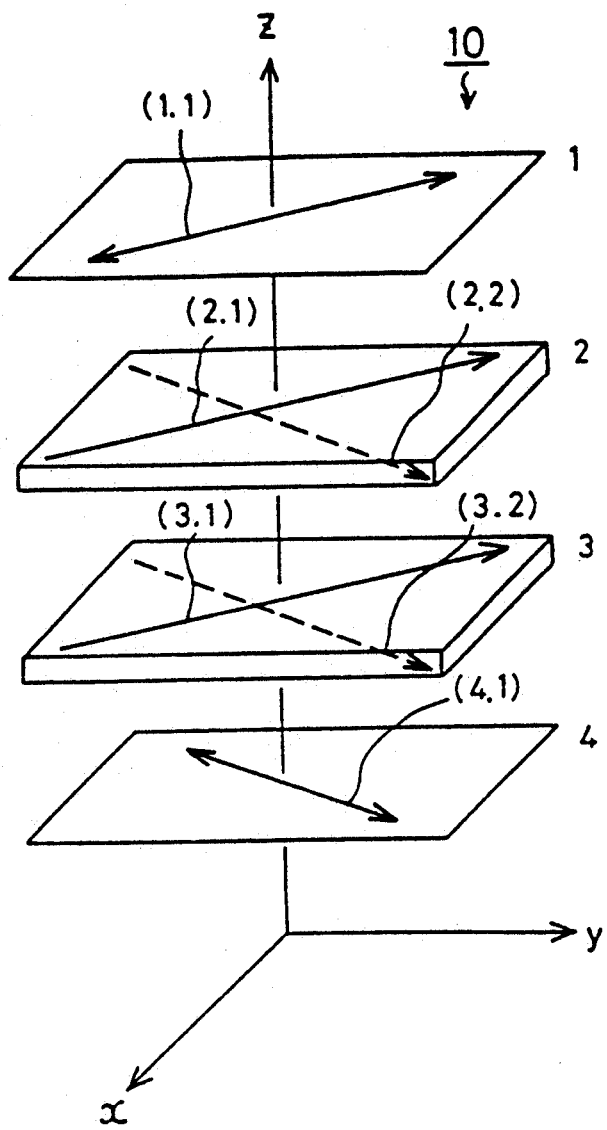
FIG. 1 is an exploded perspective view illustrating a configuration of a liquid crystal display device of an embodiment 1 according to the present invention.

Specifically, the viewing-angle compensating liquid crystal cell 2 is disposed between the polarizer 1 and the driving liquid crystal cell 3, as shown in FIG. 1. The viewing-angle compensating liquid crystal cell 2 comprises two spaced transparent substrates 2a and 2b, and liquid crystal 2c introduced into a space therebetween. The liquid crystal 2c is a mixture of twist nematic liquid crystal (ZLI-2806; manufactured by E. Merck Co., Ltd.) and chiral dopant (S811; manufactured by E. Merck Co., Ltd.). More specifically, the liquid crystal 2 is introduced into the space between upper and lower substrates 2a and 2b with a total twist angle of 990°. The liquid crystal molecules of the liquid crystal 2 are in an alignment twisted counterclockwise from the lower substrate 2b to the upper substrate 2a (counterclockwise-twist). The liquid crystal material used for the viewing-angle compensating liquid crystal cell 2 has refractive-index anisotropy $\Delta n$ of 0.039, and a twist pitch P of 3.27 $\mu m$, and constitutes a liquid crystal layer of 9 $\mu m$ thick.

The driving liquid crystal cell 3 is disposed between the viewing-angle compensating liquid crystal cell 2 and polarizer 4. The driving liquid crystal cell 3 comprises an upper substrate 3a having transparent electrode 3c formed thereon, and a lower substrate 3b having a transparent electrode 3d formed thereon. Further, the driving liquid crystal cell 3 comprises liquid crystal 3e introduced into a space between the upper and lower substrates 3a and 3b. The electrodes 3c and 3d are connected to a drive power source 3f. The liquid crystal 3e is such that a mixture of twist nematic liquid crystal (ZLI-4287; manufactured by E. Merck Co., Ltd.) and chiral dopant (S811; manufactured by E. Merck Co., Ltd.) is introduced into the space between the upper and lower substrates 3a and 3b with a twist angle of 90°. A state of the liquid crystal 3e is changed in accordance with a voltage supplied from the drive power source 3f. The liquid crystal 3e has refractive-index anisotropy $\Delta n$ of 0.093 and constitutes a liquid crystal layer of 5.5 $\mu m$ thick. Further, liquid crystal molecules are in an alignment twisted counterclockwise from the lower substrate 3b to the upper substrate 3a (counterclockwise twist).

FIG. 1 is an exploded perspective view illustrating a configuration of a liquid crystal display device of this embodiment according to the present invention. In FIG. 1, transmission axes (1.1) and (4.1) of the polarizers 1 and 4 are perpendicular to each other. Further, the transmission axis (1.1) is disposed on an imaginary line which deviates counterclockwise from a y-axis by an angle of about 135° when observed from a +z direction. In FIG. 1, rubbing axes (3.1) and (3.2) of the upper and lower substrates 3a and 3b of the driving liquid crystal cell 3 are in perpendicular to each other. Further, the rubbing axis (3.1) is disposed on an imaginary line which deviates counterclockwise from the y-axis by an angle of about 45° when observed from the +Z direction.

In FIG. 1, rubbing axes (2.1) and (2.2) of the upper and lower substrates 2a and 2b of the viewing-angle compensating liquid crystal cell 2 are perpendicular to each other. Further, the viewing-angle compensating liquid crystal cell 2 is disposed in such a manner that the rubbing axis (2.1) is parallel to the rubbing axis (3.1). The polarizer 1 is disposed in such a manner that the transmission axis (1.1) is parallel to the rubbing axis (2.1) of the viewing-angle compensating liquid crystal cell 2.

The optical rotatory power of the driving liquid crystal cell 3 is calculated by use of the equation (1.1) as follows:

$$R_1/T_1 = 0.5115 \ \mu m/90° = 5.6833 \ [nm/deg]$$

Similarly, the optical rotatory power of the viewing-angle compensating liquid crystal cell 2 is calculated by use of the equation (1.2) as follows:

$$R_2/T_2 = 0.351 \ \mu m/990° = 0.3545 \ [nm/deg]$$

When both the values are compared, the following relationship is held:

$(R_1/T_1) > (R_2/T_2)$

Specifically, the optical rotatory power of the viewing-angle compensating liquid crystal cell 2 is less than 1/10 of the optical rotatory power of the driving liquid crystal cell 3.

Figure 10:
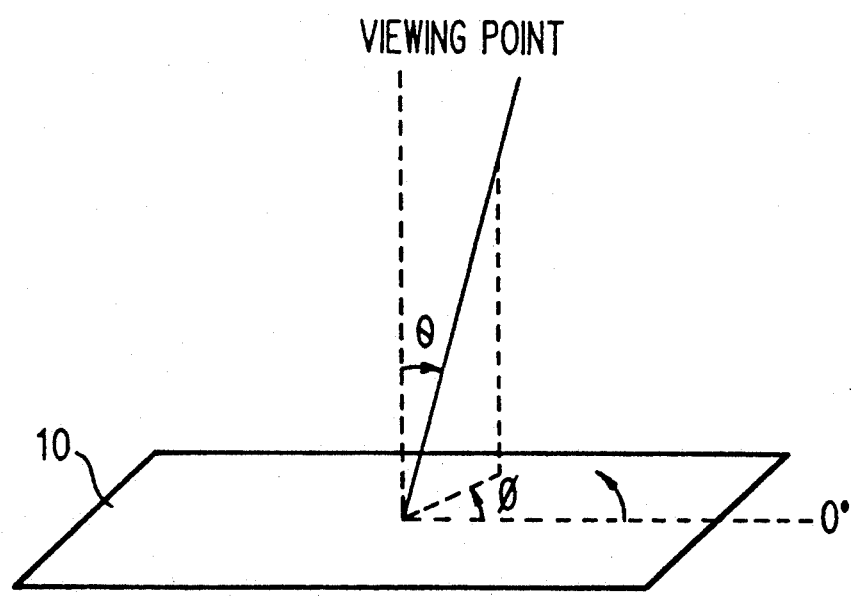
FIG. 10 is a diagram illustrating a coordinate system for use in measuring viewing-angle characteristics.
Figure 11:
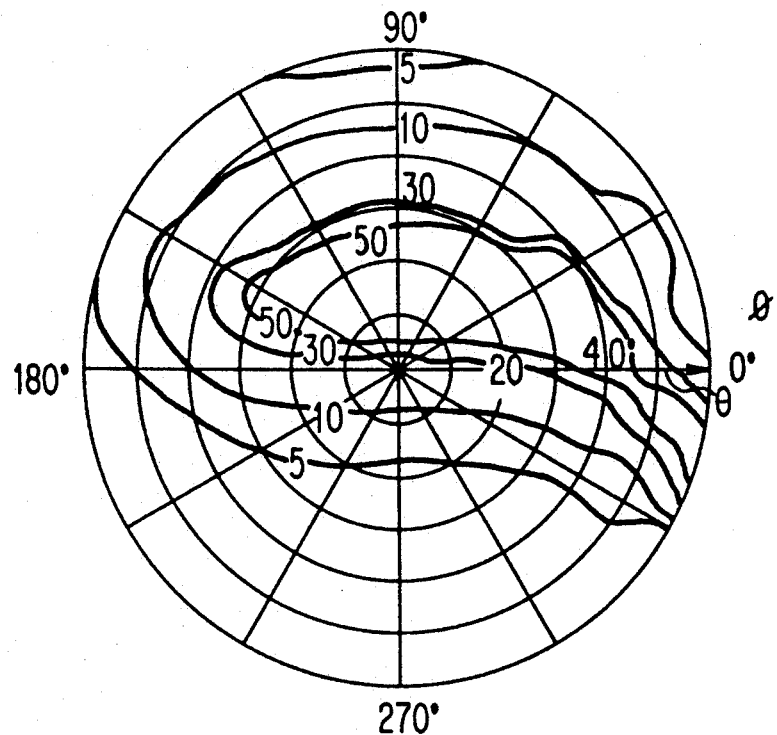
FIG. 11 is a diagram illustrating Iso-contrast characteristics for explaining advantages of the embodiment 1.

The viewing-angle characteristics of the above-described liquid crystal display device of this embodiment are measured by use of the coordinate system shown in FIG. 10. In measurement, the following prescribed voltages are supplied from the drive power source 3f so as to apply the same between the electrodes 3c and 3d of the driving liquid crystal cell 3. Specifically, the applied voltages are 1 V in the case of a bright state, and 5 V in the case of a dark (where a threshold voltage of the liquid crystal is 2 V). The results of measurement are expressed by use of polor coordinates shown in FIG. 11. In FIG. 11, Iso-contrast characteristics are expressed in the following manner. Specifically, the abscissa represents the values of $\theta$ (e.g., 20°, 40° and 60°), and an angle $\phi$ is represented by 90°, 180° and 270°, for example. Further, numerals (such as 5, 10, 30 and 50) adjacent to the respective curves represent the contrast ratios. For example, the curve with the numeral 10 indicates an Iso-contrast curve which represents that a ratio of brightness and darkness is 10:1. For instance, a point A represents that a contrast ratio is 10:1 when observed at $\theta = 50°$ and $\phi = 60°$. As can be seen from FIG. 11, viewing angles with respect to directions of 0° through 180°, which are mainly practical range, are larger than viewing angles in Iso-contrast characteristics of a conventional liquid crystal cell shown in FIG. 12 (which will be later described). Thus, in this embodiment, dependence characteristics of contrast ratios upon viewing angles have been improved. As for display color, in the case of a conventional liquid crystal display device, a display color in a dark state was changed depending on viewing angles. However, in this embodiment, a satisfactory black display color in a dark state was invariably obtained even when viewing angles were changed. Experimentally, a 10-inch (diagonal size) TFT-LCD (thin-film transistor-liquid crystal display) was manufactured by use of a liquid crystal display device of this embodiment with a color filter provided therein. As a result, there was obtained a satisfactory full-color display device capable of discriminating its display contents independently of change of direction and viewing angles.

COMPARISON EXAMPLE

For the sake of comparison, Iso-contrast characteristics in the case of a liquid crystal display device without a viewing-angle compensating liquid crystal cell 2 were measured (other elements were the same as those in the embodiment 1). In this case, viewing angles were small in directions of 0° through 50° and 130° through 180°. Further, a display color in this case was undesirably colored when viewing angles were changed.

EMBODIMENT 2

This embodiment differs from the embodiment 1 in that a viewing-angle compensating liquid crystal cell 2 is modified in the following manner. Specifically, the viewing-angle compensating cell 2 was replaced by a polymeric liquid crystal consisting of polysiloxane as a main chain and both of biphenylbenzoate and cholesteril-radical as a side chain. The polymeric liquid crystal had refractive-index anisotropy $\Delta n$ of 0.20, a helical pitch P of 3.273 $\mu$m, and layer thickness d of 1.76 $\mu$m.

Figure 13:
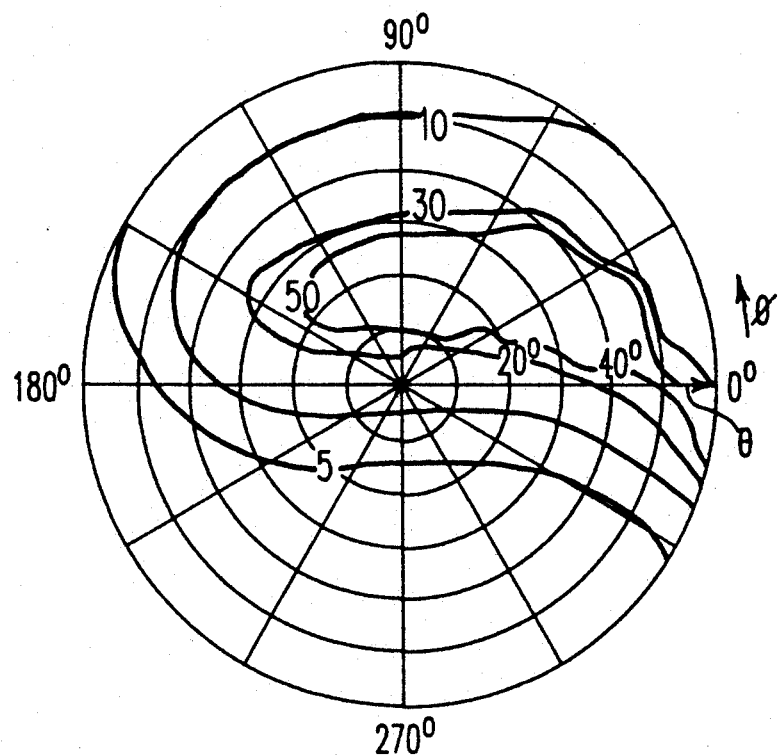
FIG. 13 is a diagram illustrating Iso-contrast characteristics for explaining viewing-angle characteristics of an embodiment 2.

Further, the number of helical rotations was 2.75 with a twist angle of 990°, and a twist direction was counterclockwise. The values of the chiral pitch P and the layer thickness d were determined by a condition in which the value of $\Delta n \times P$ and $\Delta n \times d$ consistent with one of the compensating liquid crystal cell 2 in embodiments each other. The viewing-angle characteristics of the above-described liquid crystal display device of this embodiment were measured in the same manner as in the embodiment 1. The results of measurement are shown in FIG. 13. As can be seen from FIG. 13, the Iso-contrast characteristics of the display device in this embodiment are substantially equal to those in the embodiment 1. This is because the values of $\Delta n \times P$ and $\Delta n \times d$ have been determined to the same as those in the embodiment 1. Thus, a contrast ratio of 32:1 or more was obtained in directions of 0° through 180° in a 30°-cone, and the viewing angles were expanded.

EMBODIMENT 3

This embodiment differs from the embodiment 1 in that the positional relationship of rubbing axes are changed in the following manner. Specifically, there were provided four different liquid crystal display devices such that an angle $\omega$ constituted by a rubbing axis (2.2) of a lower substrate of a viewing-angle compensating liquid crystal cell 2 and a rubbing axis (3.1) of an upper substrate of a driving liquid crystal cell 3 was changed into four different angles such as 90°, 120°, 150° and 180°. The viewing-angle characteristics of the four different liquid crystal display devices were respectively measured. The results of measurement are shown in Table 1.

TABLE 1

Figure 14A:
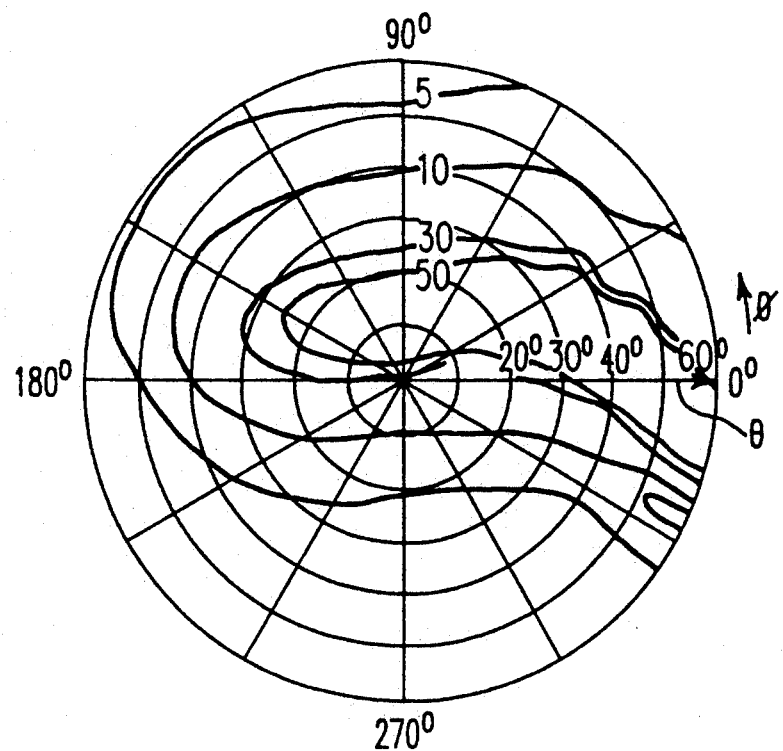
FIG. 14a through FIG. 14c are diagrams illustrating Iso-contrast characteristics for explaining advantages of an embodiment 3.
Figure 14B:
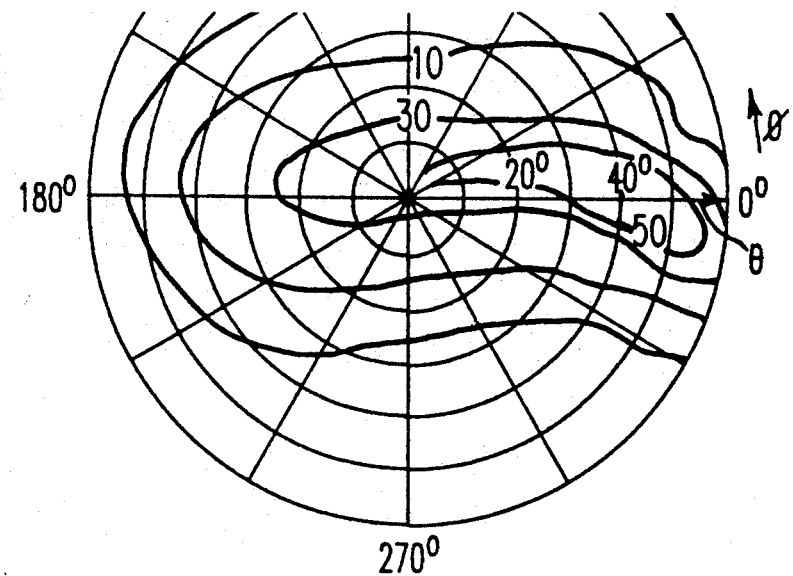
Figure 14C:
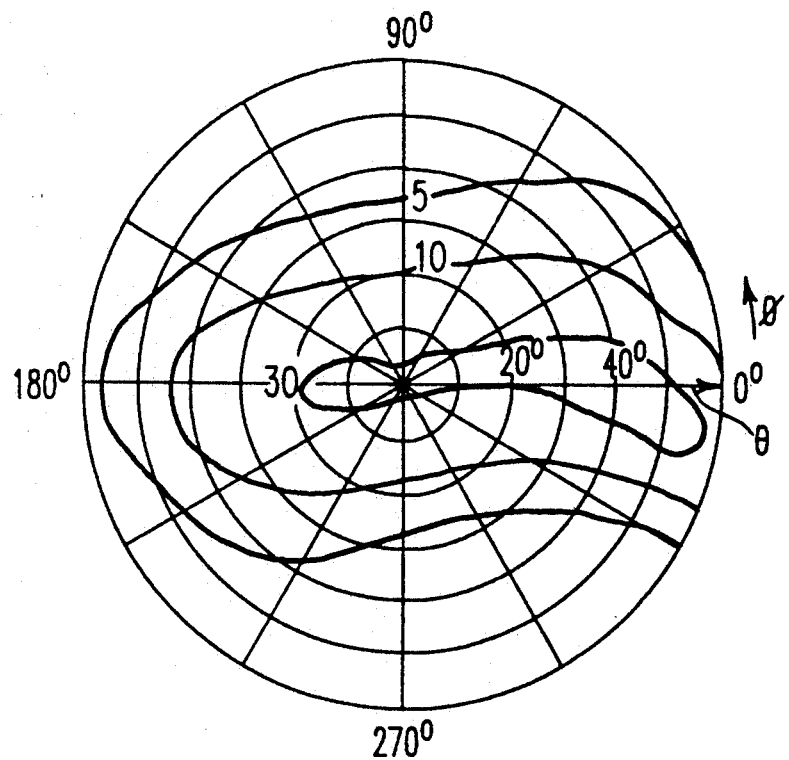

| Iso-contrast Characteristics of Respective Configurations | | |
|---|---|---|
| configurations | angle $\omega$ between rubbing axes | Iso-contrast characteristics shown in |
| 1 | 90° | FIG. 1 |
| 2 | 120° | FIG. 14a |
| 3 | 150° | FIG. 14b |
| 4 | 180° | FIG. 14c |

As the angle $\omega$ is changed from 90° to 180°, the Iso-contrast characteristics are changed as seen from the changes shown in FIG. 11 and FIG. 14a through FIG. 14c. Specifically, as the positional relationship between two axes (2.2) and (3.1) is changed from orthogonal intersection toward parallel, the Iso-contrast curves move to distribute around the viewing angle $\theta 0°$. As described above, in this embodiment, the Iso-contrast characteristics can be easily changed by changing the positional relationship between a viewing-angle compensating liquid crystal cell 2 and the driving liquid crystal cell 3.

EMBODIMENT 4

Figure 15:
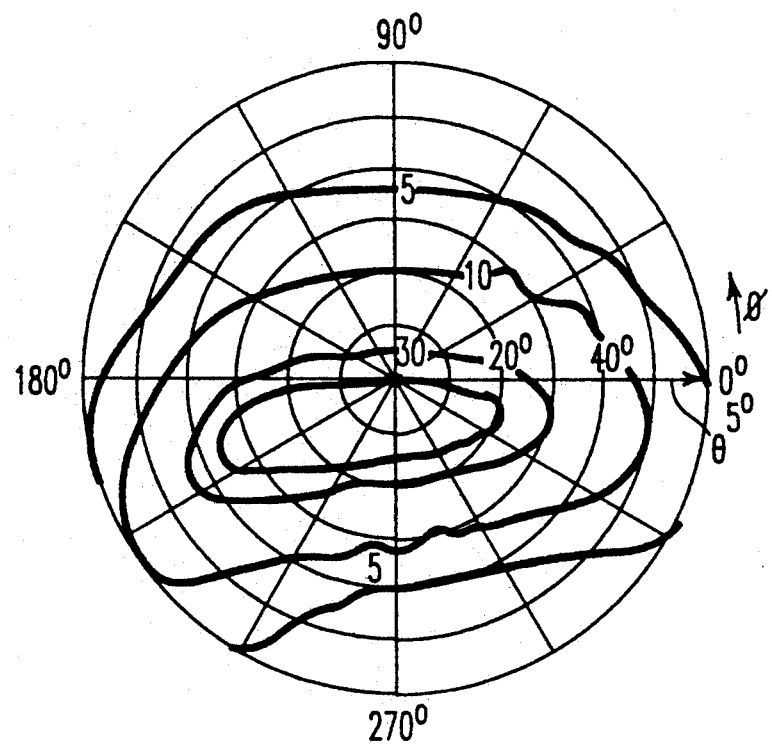
FIG. 15 is a diagram illustrating Iso-contrast characteristics for explaining advantages of an embodiment 4.

This embodiment differs from the embodiment 1 in that a viewing-angle compensating liquid crystal cell 2 is modified in the following manner. Specifically, the cell 2 was manufactured by use of a mixture of a liquid crystal material (ZLI-2806; manufactured by E. Merck Co., Ltd.) having refractive-index anisotropy $\Delta n$ of 0.039 and a chiral dopant (R811; manufactured by E. Merck Co., Ltd.) causing a liquid crystal molecular alignment to have a clockwise twist with a helical pitch of 2.96 $\mu$m. The clockwise-twist viewing-angle compensating liquid crystal cell 2 had a twist angle of 450°, and a liquid crystal layer of 3.7 μm thick. Further, an angle ω constituted by rubbing axis (2.2) of a lower substrate of the viewing-angle compensating liquid crystal cell 2 and a rubbing axis (3.1) of an upper substrate of a driving liquid crystal cell 3 was determined to be 90°. Iso-contrast characteristics of a liquid crystal display device of this embodiment were measured in the same as in the embodiment 1. The results of measurement are shown in FIG. 15. As can be seen from FIG. 15, an original 90° viewing direction was changed to a 180° viewing direction. For the purpose of experimental observation a gray scale display operations were performed by use of the liquid crystal display device of this invention. As a result, satisfactory viewing-angle characteristics were obtained in directions from 180° to 360° through 270°.

EMBODIMENT 5

This embodiment differs from the embodiment 1 in that a viewing-angle compensating liquid crystal cell 2 is modified in the following manner. Specifically, the cell 2 was manufactured by use of a mixture of a liquid crystal material and a chiral dopant (R811; manufactured by E. Merck Co., Ltd.) causing liquid crystal molecular alignment to have clockwise twist with a twist angle of 990° (a twist pitch=3.27 μm). The clockwise-twist viewing-angle compensating liquid crystal cell 2 had a liquid crystal layer of 9 μm thick. Further, the positional relationship of rubbing axes are changed in the following manner. Specifically, there were provided four different liquid crystal display devices such that an angle ω constituted by a rubbing axis (2.2) of a lower substrate of a viewing-angle compensating liquid crystal cell 2 and a rubbing axis (3.1) of an upper substrate of a driving liquid crystal cell 3 was changed into four different angles such as 90°, 120°, 150° and 180°. The Iso-contrast characteristics of the four different liquid crystal display devices were respectively measured. The results of the measurement are shown in Table 2.

TABLE 2

Figure 16A:
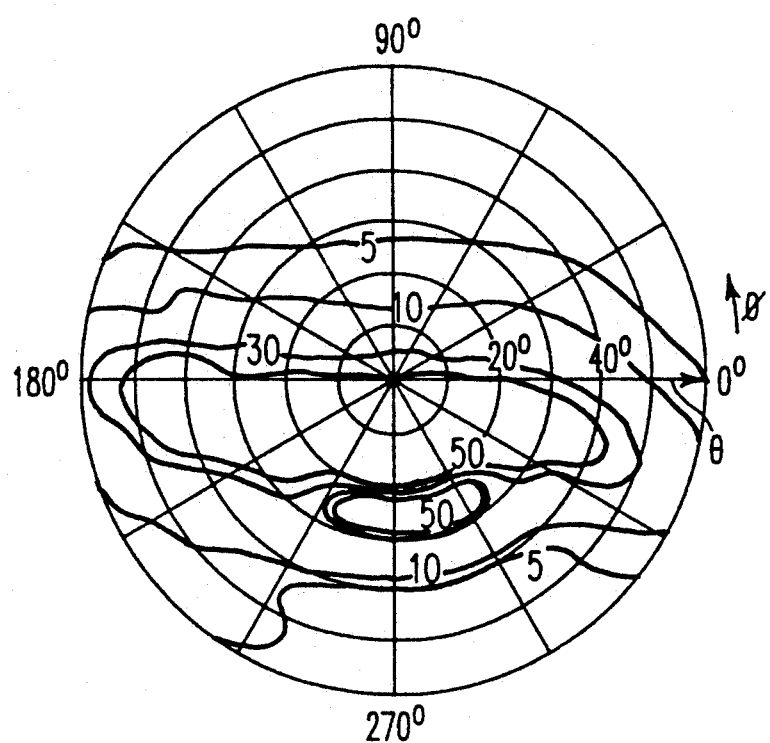
FIG. 16a through FIG. 16d are diagrams illustrating Iso-contrast characteristics for explaining advantages of an embodiment 5.
Figure 16B:
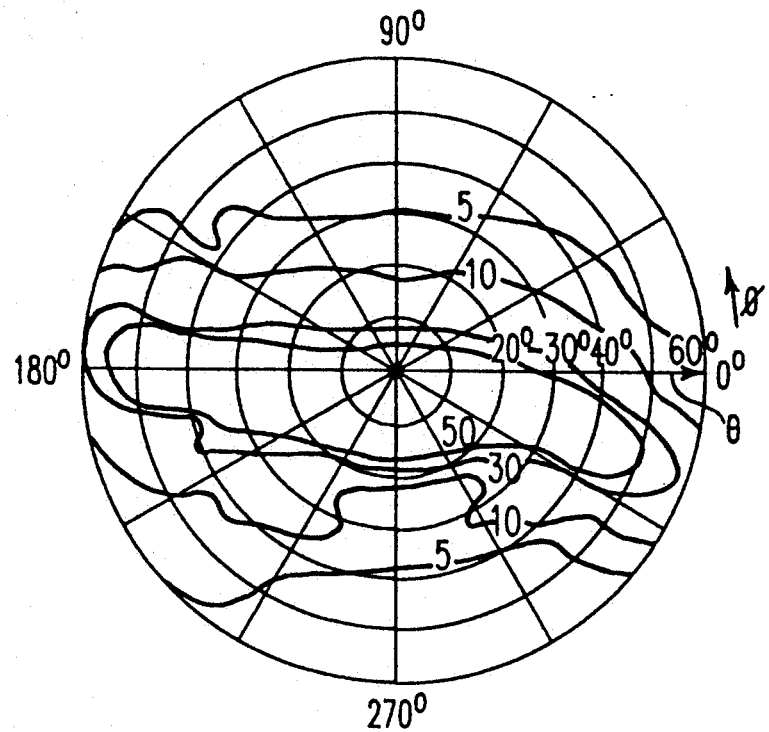
Figure 16C:
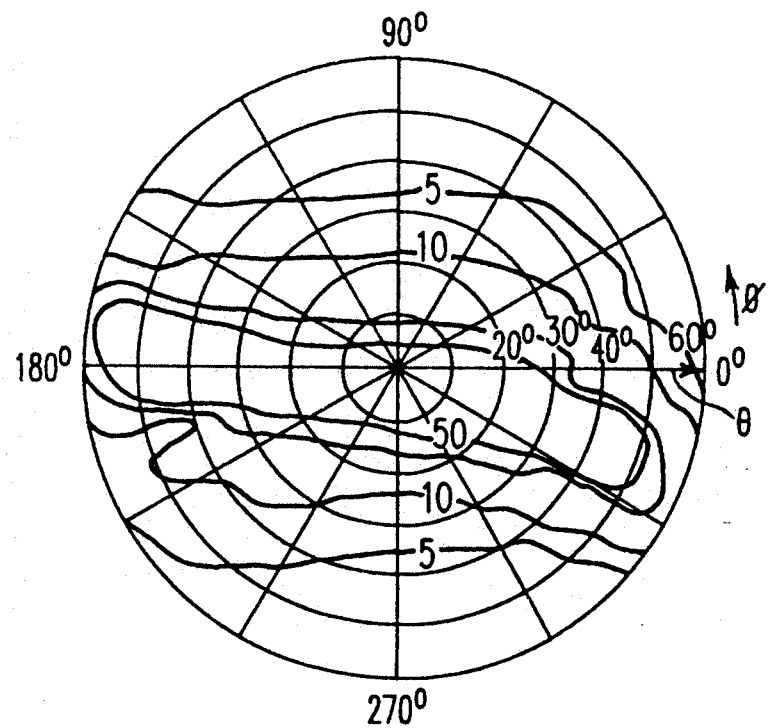
Figure 16D:
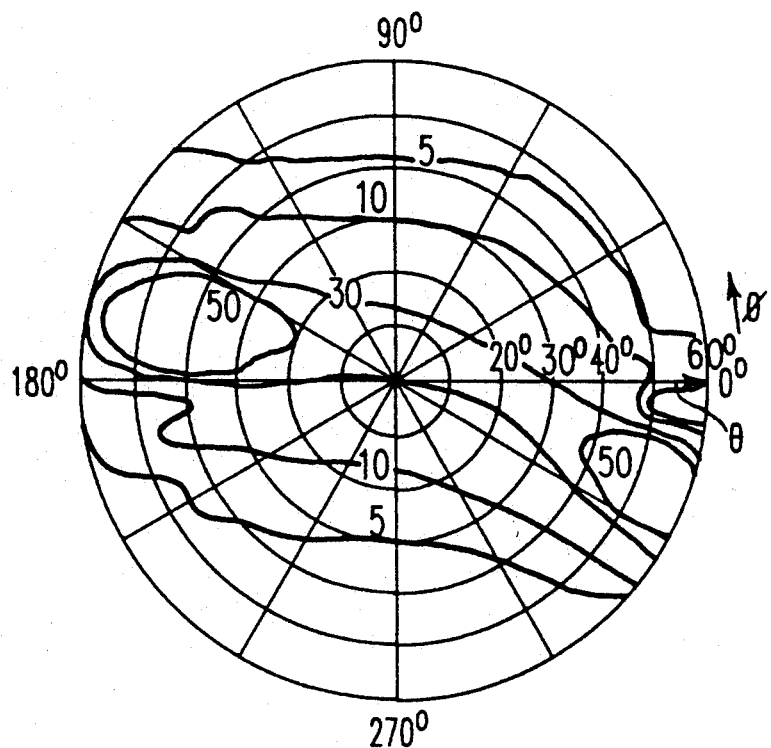

| viewing-Angle Characteristics of Respective Configurations | | |
|---|---|---|
| configurations | angle ω between rubbing axes | Iso-contrast characteristics shown in |
| 1 | 90° | FIG. 16a |
| 2 | 120° | FIG. 16b |
| 3 | 150° | FIG. 16c |
| 4 | 180° | FIG. 16d |

In this embodiment, a twist direction of the liquid crystal molecular alignment in the liquid crystal layer of the viewing-angle compensating liquid crystal cell 2 is reverse to that in the liquid crystal layer of the driving liquid crystal cell 3. Thus, as can be seen from FIG. 16a through FIG. 16d, an original 90° viewing direction was changed to a 180° viewing direction. Further, in this embodiment, the angles ω were changed, so that the shapes of the curves indicating Iso-contrast characteristics were also changed.

EMBODIMENT 6

This embodiment differs from the embodiment 1 in that a viewing-angle compensating liquid crystal cell 2 is modified in the following manner. Specifically, a twist angle (or the number of rotations) of liquid crystal molecular alignment in a liquid crystal layer of the cell 2 was changed into seven different angles by adjusting the mixing concentration of a counterclockwise-chiral dopant (S811; manufactured by E. Merck Co., Ltd.). More specifically, there were provided seven different liquid crystal display devices having seven different twist angles of 810° through 1170°. The viewing-angle characteristics of these display devices were respectively measured. The results of measurement are shown in Table 3.

TABLE 3

Figure 17A:
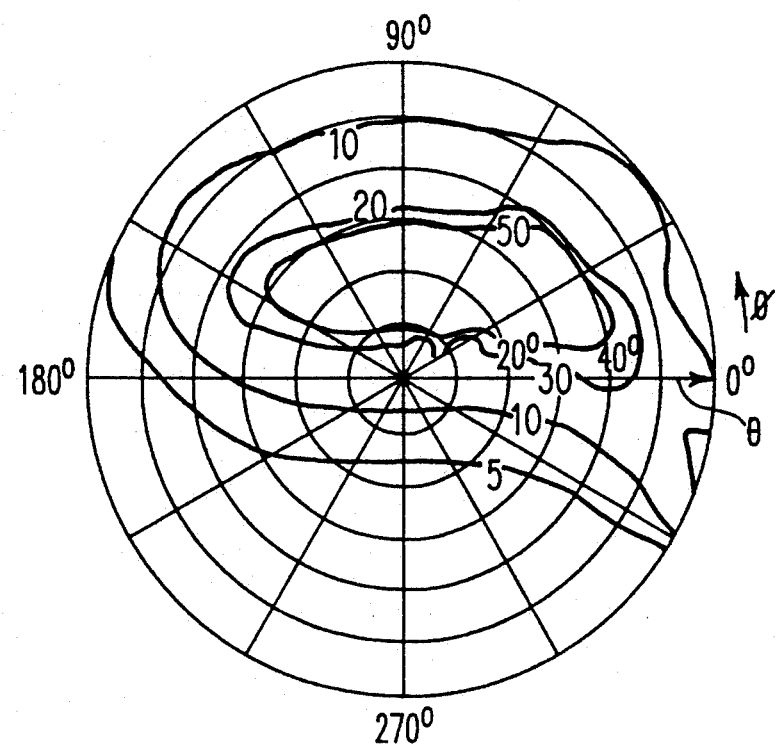
FIG. 17a through FIG. 17g are diagrams illustrating Iso-contrast characteristics for explaining advantages of an embodiment 6.
Figure 17B:
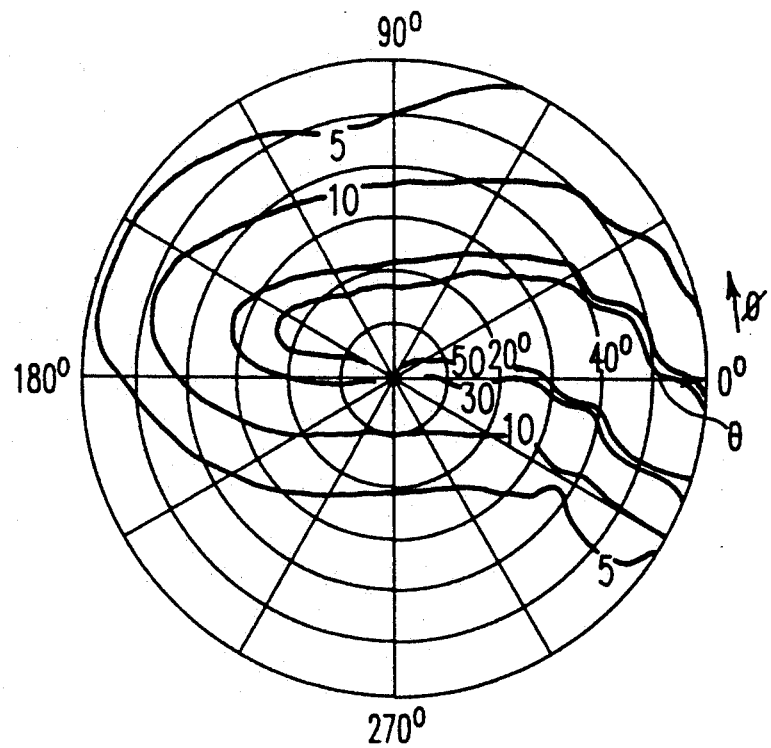
Figure 17C:
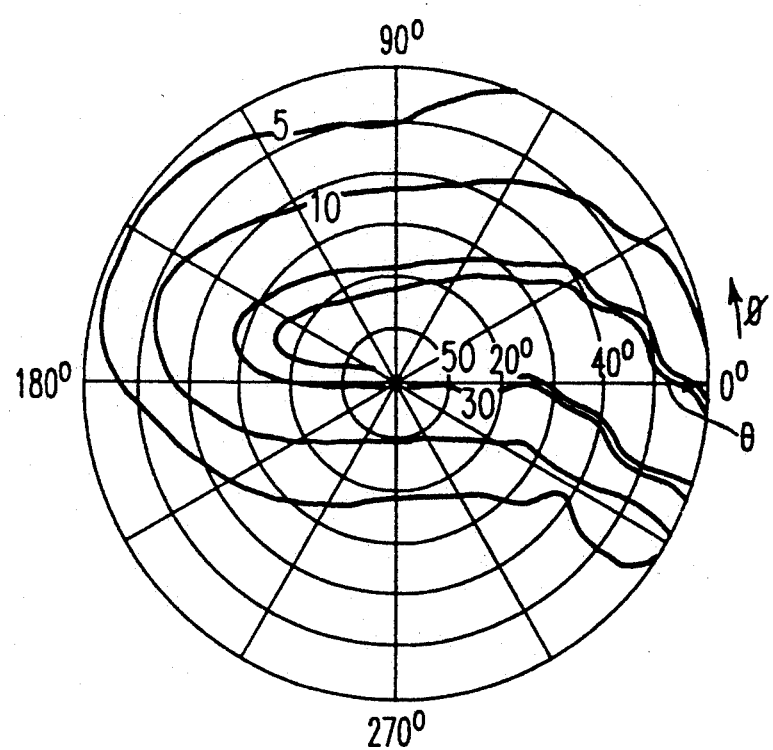
Figure 17D:
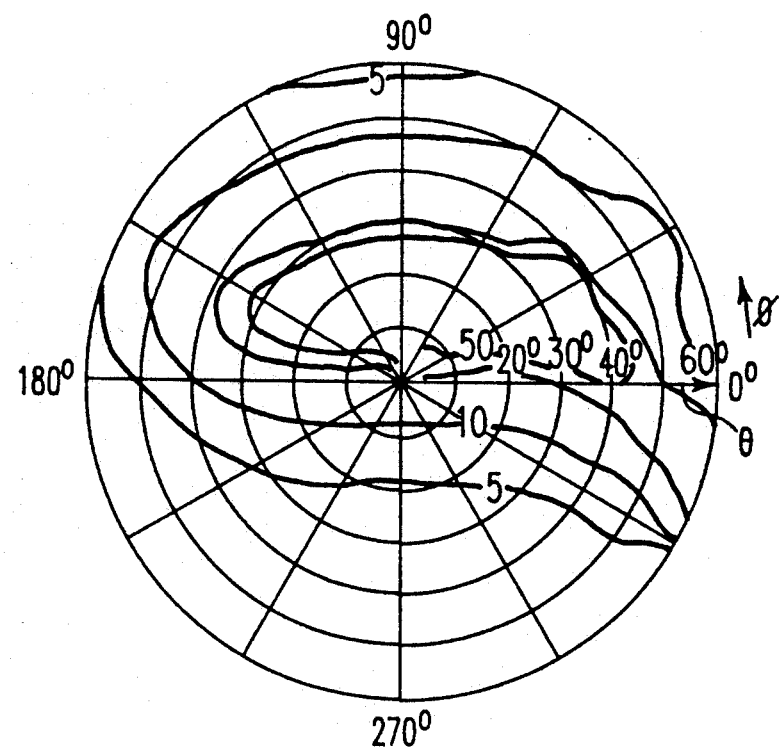
Figure 17E:
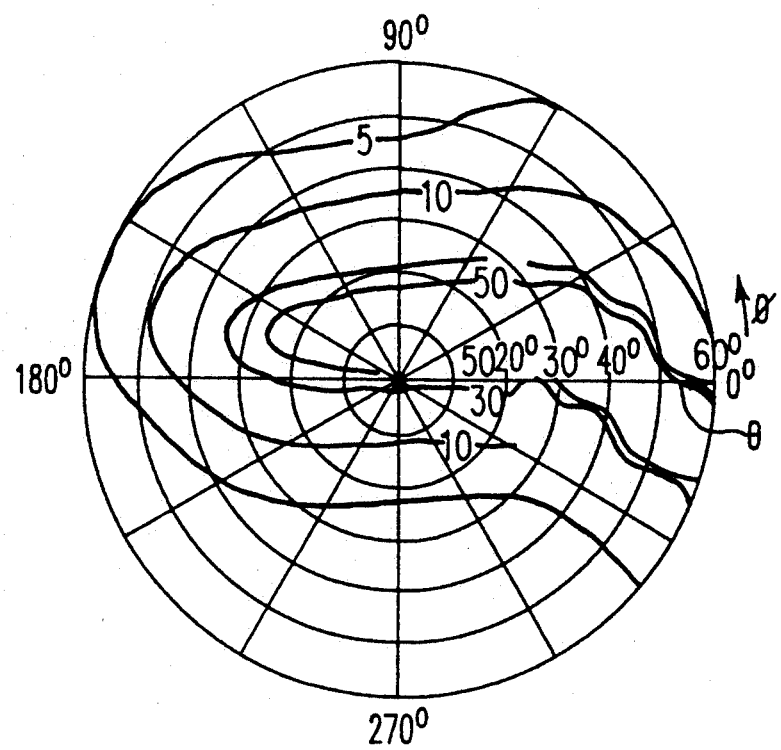
Figure 17F:
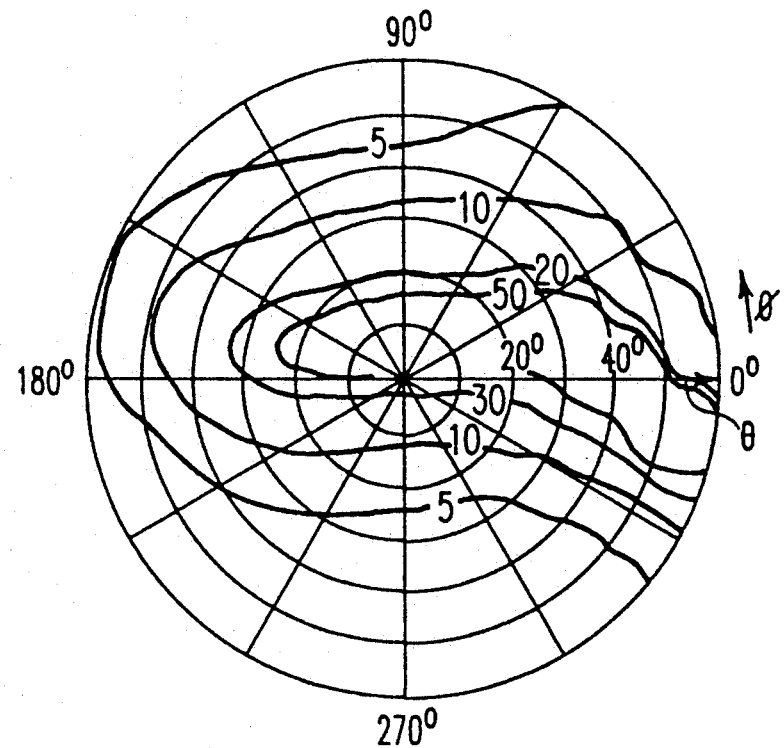
Figure 17G:
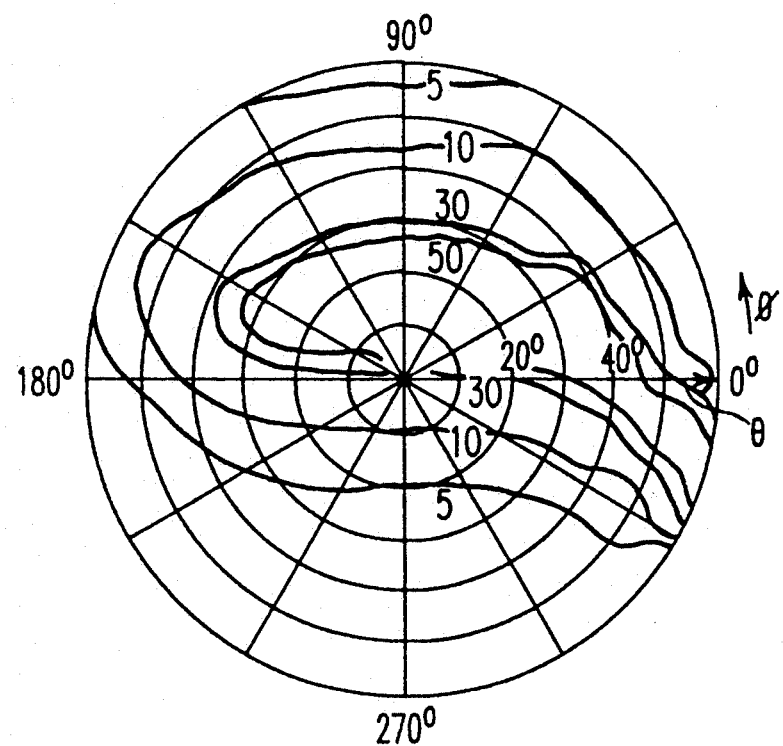

| Number of Twist Rotations in Compensation Cells and Advantages thereof | |
|---|---|
| number of twist rotations (twist angles) of compensation cells | Iso-contrast characteristics shown in |
| 2.25 (810°) | FIG. 17a |
| 2.50 (900°) | FIG. 17b |
| 2.583 (930°) | FIG. 17c |
| 2.75 (990°) | FIG. 17d |
| 2.916 (1050°) | FIG. 17e |
| 3.00 (1080°) | FIG. 17f |
| 3.25 (1170°) | FIG. 17g |

As can be seen from Table 3 and FIG. 17a through FIG. 17g, as a twist angle in the viewing-angle compensating liquid crystal cell 2 increases, an Iso-contrast curve moves toward the center of the polar coordinate. Specifically, a viewing-angle direction becomes a direction of a normal on the display surface of the liquid crystal display device. Further, when the cases of FIGS. 17a, 17b and 17g are sequentially compared, in which a twist angle increases as 450°+a multiple of 180° (i.e., the number of twist rotations increases as 2.25, 2.75 and 3.25), it can be understood that the shapes of Iso-contrast curves are substantially constant. Further, in all the cases, the shapes of the Iso-contrast curves, which indicate that a contrast ratio=10:1, are substantially semicircular in the directions of 0° through 180°. This suggest that a contrast ratio of a certain constant value can be obtained in all the directions when observed at a fixed viewing angle.

The shapes of Iso-contrast curves in the cases of FIGS. 17b, 17c, 17e and 17f (i.e., twist angle are other than 450°+a multiple of 180°) differ from the shapes of Iso-contrast curves in the cases of FIGS. 17a, 17d and 17g, but become shapes which are laterally long. As described above, Iso-contrast characteristics of a liquid crystal display device can be changed by changing the number of twist rotations in a viewing-angle compensating liquid crystal cell.

EMBODIMENT 7

This embodiment differs from the embodiment 1 in that a viewing-angle compensating liquid crystal cell 2 is modified in the following manner. Specifically, as the cell 2, there was provided a counterclockwise-twist liquid crystal cell having a liquid crystal layer of 3.5 μm thick and a twist angle of 270°. In this embodiment, a liquid crystal material was the same as in the embodiment 1. A liquid crystal display device employing the above-described cell 2 was manufactured, and Iso-contrast characteristics of the device were measured. The results of measurement are shown in FIG. 18.

Figure 12:
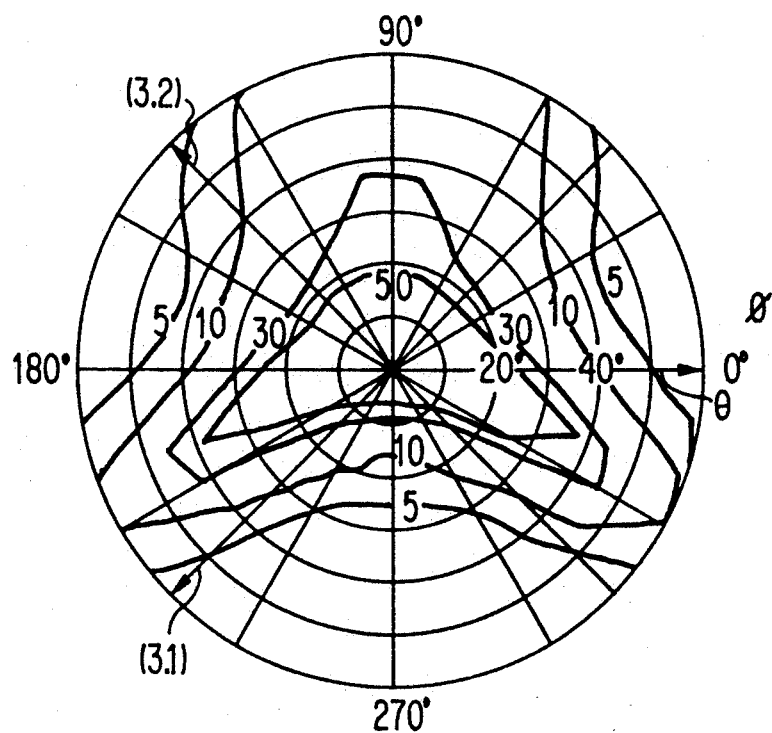
FIG. 12 is a diagram illustrating Iso-contrast characteristics for explaining viewing-angle characteristics of a conventional device.
Figure 18:
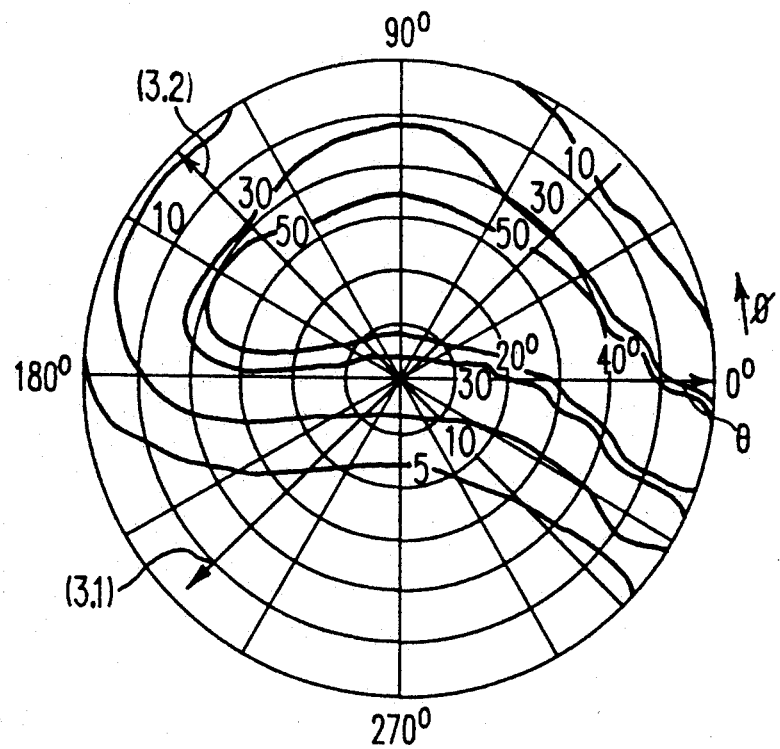
FIG. 18 is a diagram illustrating Iso-contrast characteristics for explaining advantages of an embodiment 7.

As can be seen from FIG. 18, viewing angles with respect to directions of 0° through 180°, which are mainly a practical range, are larger than viewing angles in Iso-contrast characteristics of a conventional liquid crystal display device (see FIG. 12). Thus, in this embodiment, dependence characteristics of contrast ratios upon viewing angles have been improved. As for display color, in the case of a conventional liquid crystal display device, a display color in a dark state was changed depending on viewing angles. However, in this embodiment a satisfactory black display color in a dark state was invariably obtained even when viewing angles were changed. Experimentally, a 10-inch (diagonal size) TFT-LCD was manufactured by use of a liquid crystal display device according to this embodiment with a color filter provided therein. As a result, there was obtained a satisfactory full-color display device capable of discriminating its display contents independently of change of directions and viewing angles.

EMBODIMENT 8

This embodiment differs from the embodiment 1 in that a driving liquid crystal cell 3 is modified in the following manner. Specifically, the cell 3 was manufactured by use of a mixture of nematic liquid crystal (ZLI-2293; manufactured by E. Merck Co., Ltd.) and a chiral dopant (S811; manufactured by E. Merck Co., Ltd.), the cell 3 having refractive-index anisotropy $\Delta n$ of 0.13, a liquid crystal layer of 6.5 $\mu$m thick and a twist angle of 240° (counterclockwise in the ST mode). The driving liquid crystal cell 3 was disposed in such a manner that a rubbing axis of a lower substrate of the cell 3 was disposed on a line deviated clockwise by 30° from a y-axis as observed from a +z-axis. Further, a transmission axis (1.1) of an upper polarizer was disposed on a line deviated counterclockwise by 90° from a y-axis as observed from a +z-axis. Further, a transmission axis (4.1) of a lower polarizer was disposed on a line deviated counterclockwise by 110° from the y-axis as observed from the +Z-axis. A liquid crystal display device of this embodiment exhibits a blue display with no applied voltage, and a white display with applied voltage. Experimentally, a 640×400—pixel liquid crystal display device was manufactured in accordance with the configuration of this embodiment. This display device was operated under conditions of 1/200—duty and 1/15—bias, and viewing-angle characteristics of the display device were measured. The results of the measurement are shown in FIG. 19.

Figure 19:
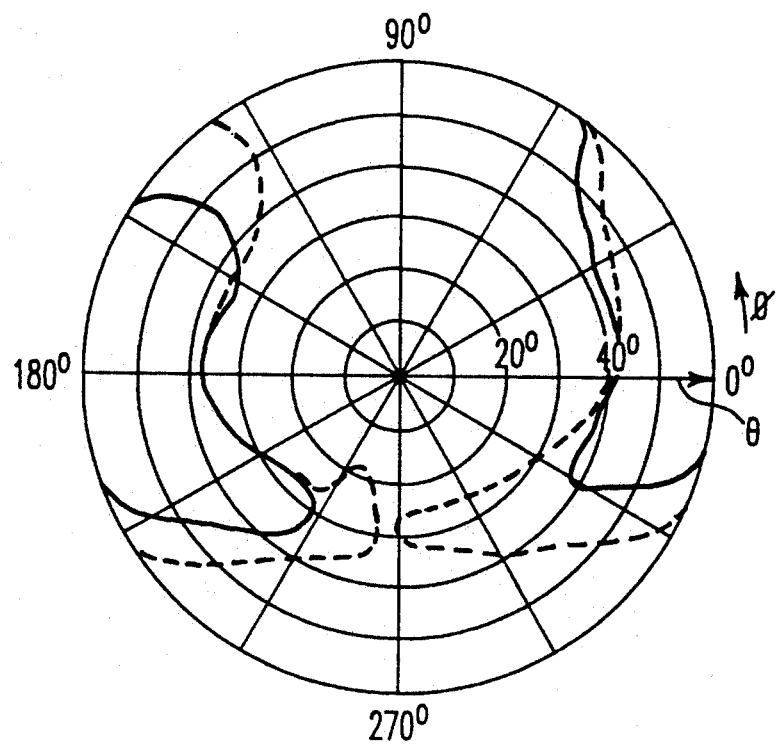
FIG. 19 is a diagram illustrating normalized Iso-transmission characteristics for explaining advantages of an embodiment 8.

In FIG. 19, particular viewing angles relative to respective directions are illustrated. The particular viewing angles are such that values, which are obtained by dividing intensities (in the case when viewing angles are changed in a bright state) by intensities (of a normal on a display surface), become 0.4 or more. In FIG. 19, the solid lines indicate normalized Iso-transmission characteristics in the case of this embodiment, and the dotted lines indicate those in the case when a viewing-angle compensating liquid crystal cell 2 is not used. As can be seen from FIG. 19, regions surrounded by the solid lines (this embodiment) are smaller than regions surrounded by the dotted lines (without the cell 2). This indicates that normalized Iso-transmission characteristics in a bright state of this embodiment have been significantly improved.

EMBODIMENT 9

This embodiment differs from the embodiment 1 in that a viewing-angle compensating liquid crystal cell 2 is replaced with an optically anisotropic layer in the following manner. Specifically, a chiral dopant (S811; manufactured by E. Merck Co., Ltd.) was mixed with a liquid crystal material (ML-1007; manufactured by E. Merck Co., Ltd.) having a refractive-index anisotropy $\Delta n$ of 0.2. There were provided three different optically anisotropic layers having all the same twist pitch P of 0.19 $\mu$m but different in their liquid crystal layer thickness. These optically anisotropic layers respectively had values of n×P (where refractive indexes are 1.5 or more) are 285 nm being smaller than a value in a range of visible wavelengths. There were provided three different liquid crystal display devices respectively having the above-described three different optically anisotropic layers. The viewing-angle characteristics of these display devices were measured. The results of measurement are shown in Table 4.

TABLE 4

Figure 20A:
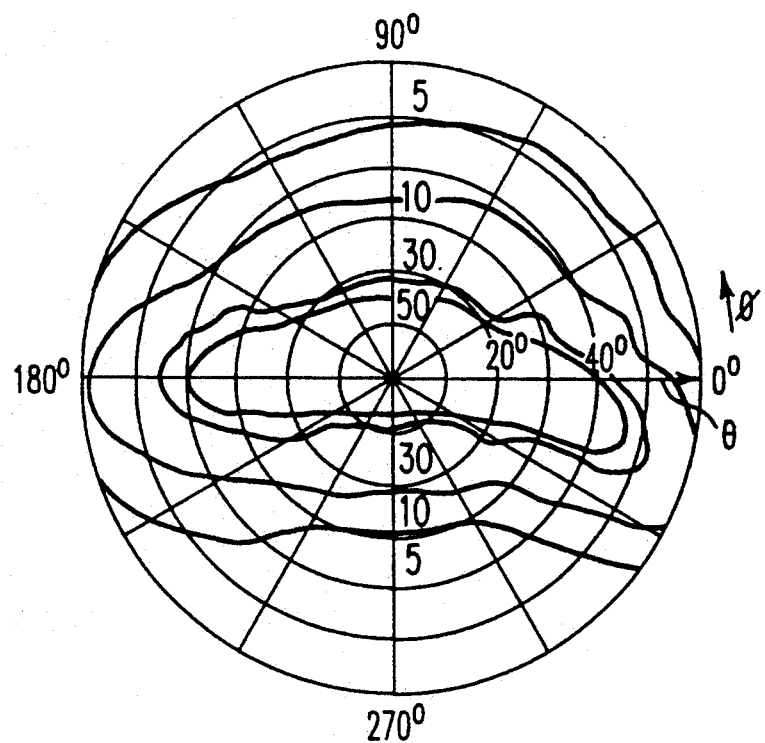
FIG. 20a through FIG. 20c are diagrams illustrating Iso-contrast characteristics for explaining advantages of an embodiment 9.
Figure 20B:
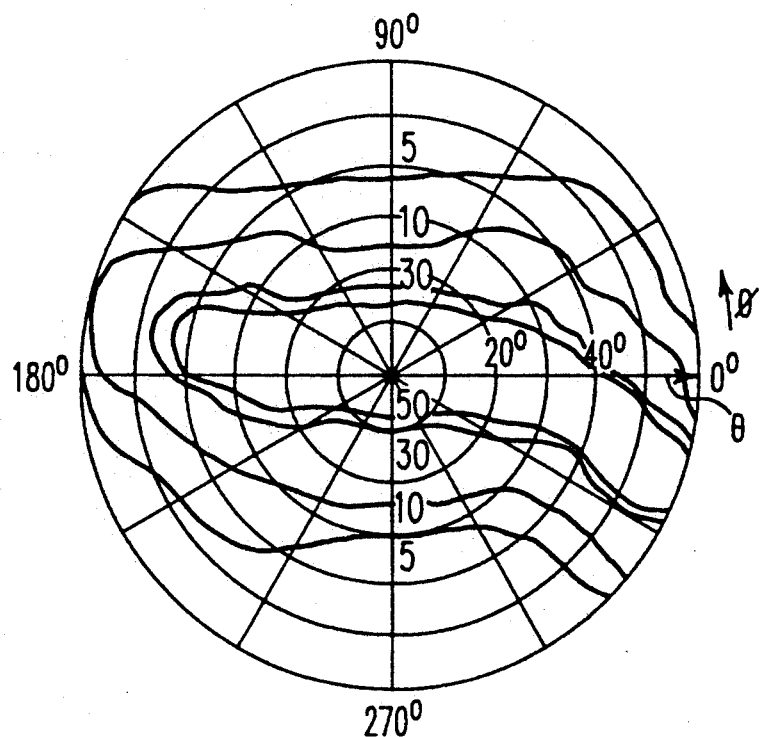
Figure 20C:
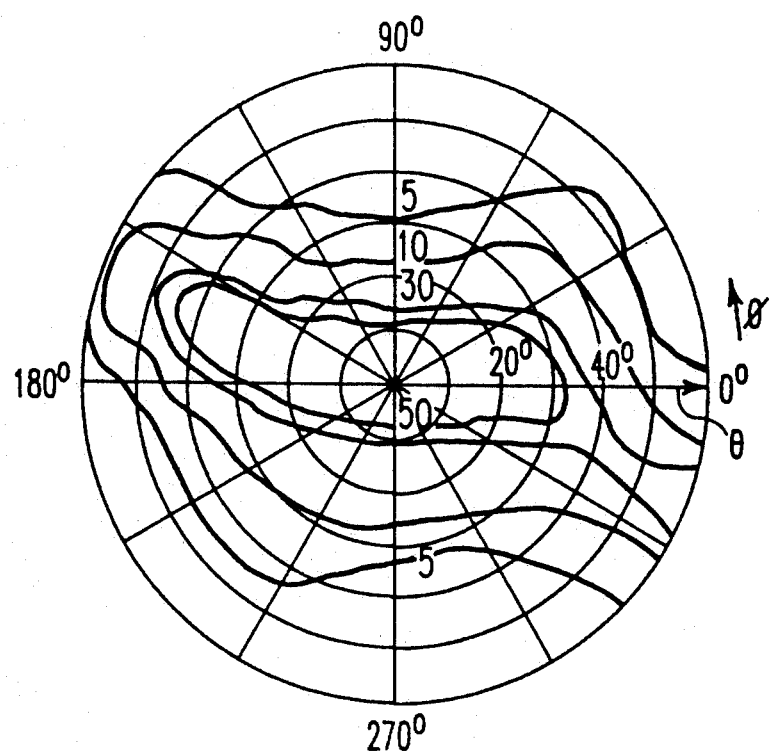

| Iso-contrast Characteristics of Respective Configurations | | |
|---|---|---|
| configurations | thickness of liquid crystal layer of optically anisotropic layer | Iso-contrast characteristics shown in |
| 1 | 0.95 $\mu$m | FIG. 20a |
| 2 | 1.9 $\mu$m | FIG. 20b |
| 3 | 2.85 $\mu$m | FIG. 20c |

As can be seen from Table 4 and FIGS. 20a and 20c, as the thickness of a liquid crystal layer of an optically anisotropic layer increases, a preferable viewing angle expands in directions of 0° and 180° (left and right direction). Further, the Iso-contrast curves are changed into shapes symmetrical with respect to the 0°–180°-direction line. As described above, viewing-angle characteristics can be easily changed by changing the layer thickness of an optically anisotropic layer.

EMBODIMENT 10

Figure 21:
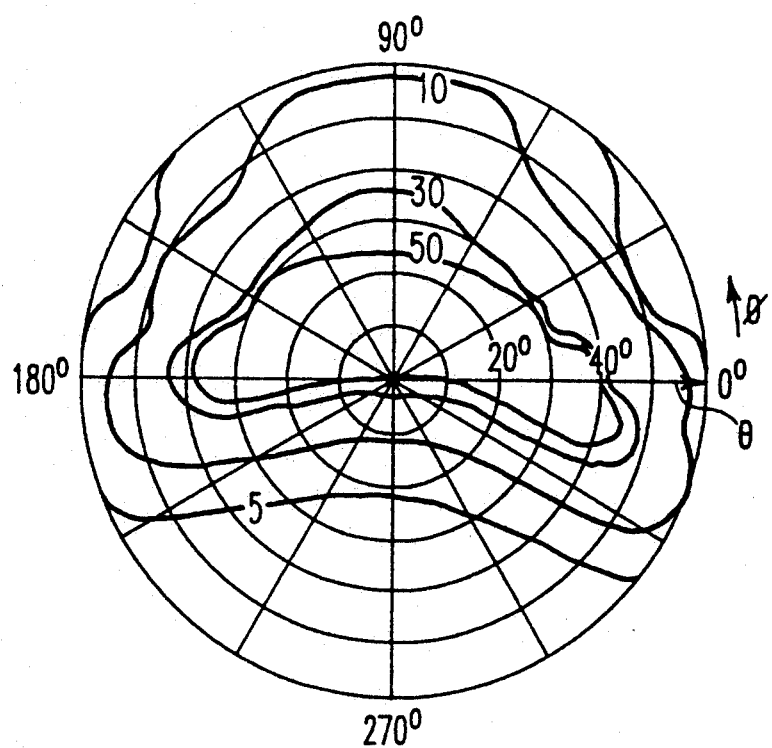
FIG. 21 is a diagram illustrating Iso-contrast characteristics for explaining advantages of an embodiment 10.

This embodiment differs from the embodiment 1 in that a viewing-angle compensating liquid crystal cell 2 is modified in the following manner. Specifically, the viewing-angle compensating cell 2 was replaced by a liquid crystal polymer consisting of polysiloxane as a main chain and both of biphenylbenzoate and cholesteril-radical as a side chain. The polymeric liquid crystal had refractive-index anisotropy $\Delta n$ of 0.20, and a chiral pitch P of 0.468 $\mu$m. Thickness of the polymeric liquid crystal layer was 0.117 $\mu$m, and a twist angle was 90°, and a twist direction was counterclockwise. There was provided a liquid crystal display device employing the above-described viewing-angle compensating layer. The viewing-angle characteristics of the display device were measured in the same manner as in the embodiment 1. The results of measurement are shown in FIG. 21. As can be seen from FIG. 21, contrast ratios of 30:1 or more are obtained in a 30°-cone in directions of 0° through 180°.

EMBODIMENT 11

Figure 22:
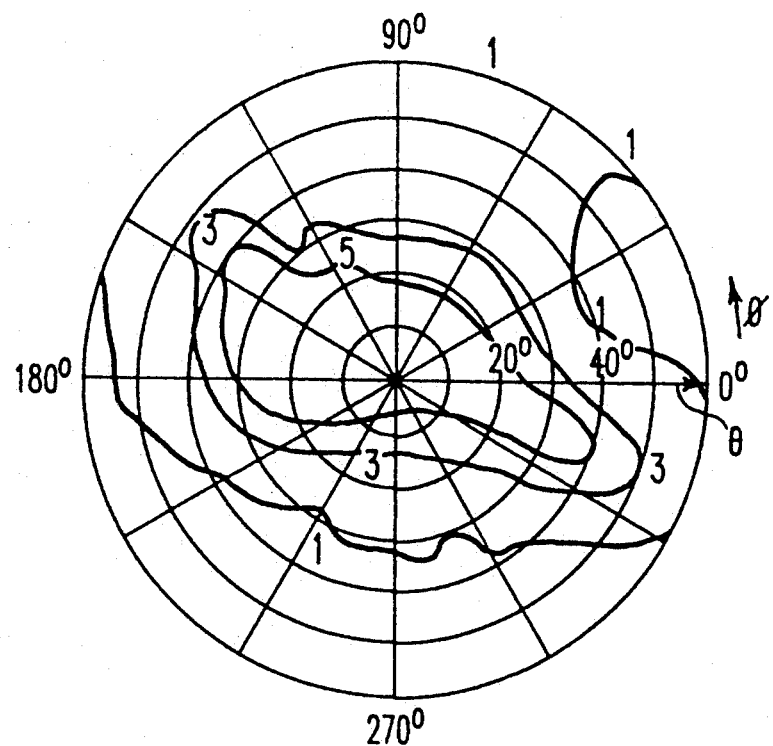
FIG. 22 is a diagram illustrating Iso-contrast characteristics for explaining advantages of an embodiment 11.

This embodiment differs from the embodiment 1 in that a driving liquid crystal cell 3 and a viewing-angle compensating liquid crystal cell 2 are modified in the following manner. Specifically, the cell 3 was manufactured by use of liquid crystal in an ST mode (counterclockwise twist with a twist angle of 240°). The employed liquid crystal was twist nematic liquid crystal being a mixture of nematic liquid crystal (ZLI-2293; manufactured by E. Merck Co., Ltd.) and a chiral dopant (S811; manufactured by E. Merck Co., Ltd.). Thickness of a liquid crystal layer of the cell 3 was 6.5 $\mu$m, and refractive-index anisotropy $\Delta n$ thereof was 0.131. Next, the cell 2 was manufactured by use of chiral nematic liquid crystal (clockwise twist with a twist angle of 360°) being a mixture of nematic liquid crystal (ZLI-2293; manufactured by E. Merck Co., Ltd.). Thickness of a liquid crystal layer of the cell 2 was 7 μm. The value of $\Delta n \times P$ of the cell 2 was 0.917 μm greater than a value in a range of visible wavelengths, so that display colors were changed depending on viewing angles. Experimentally, a 640×400—pixel liquid crystal display device of an ST-type was manufactured by use of the cells 2 and 3 in the manner as shown in FIG. 1. Specifically, the cell 2 and the cell 3 were disposed in close contact with each other. Further, a rubbing axis (2.2) of the cell 2 and a rubbing axis (3.1) of the cell 3 orthogonally intersected each other. Further, the rubbing axis (3.1) was disposed on a line deviated counterclockwise by 30° from a y-axis as observed from a +Z-axis. Further, polarizers 1 and 4 were disposed in such a manner that a transmission axis (1.1) was disposed on a line deviated counterclockwise by 95° from the y-axis as observed from the +Z-axis, and a transmission axis (4.1) was disposed on a line deviated clockwise by 5° from y-axis as observed from the +Z-axis. The thus obtained display device of this embodiment was operated in a multiplex drive under conditions of 1/200-duty and 1/13-bias. As a result, a satisfactory black-and-white display was realized without bifringence colors peculiar to an ST-type liquid crystal display device. Further, viewing-angle characteristics of the liquid crystal display device of this embodiment were measured. The results of the measurement are shown in FIG. 22. As can be seen from FIG. 22 preferable viewing angles are expanded (better understood as compared to FIG. 23 which will be later described).

COMPARISON EXAMPLE

Figure 23:
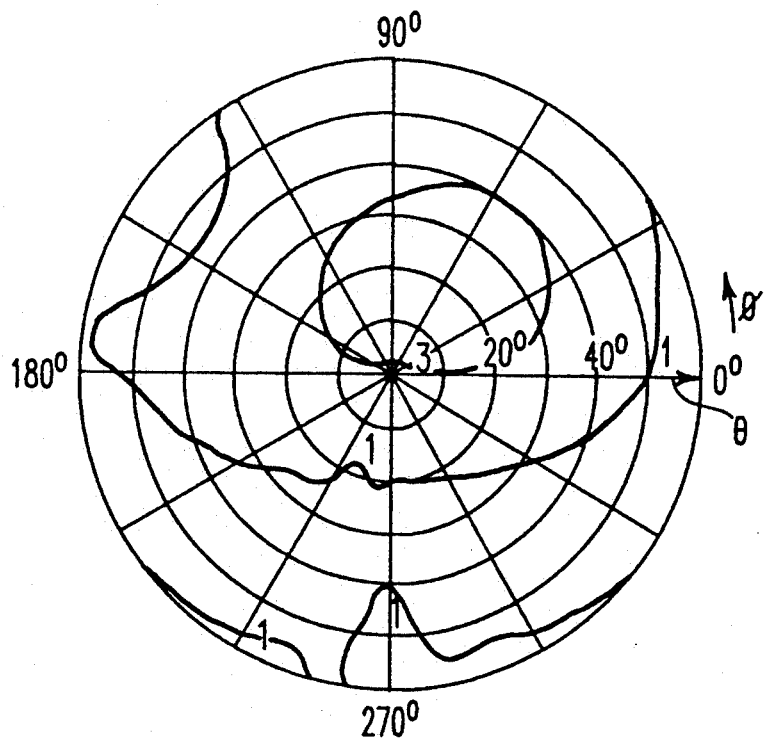
FIG. 23 is a diagram illustrating Iso-contrast characteristics for explaining a comparison example of the embodiment 11.

For the sake of comparison, viewing-angle characteristics in the case of a liquid crystal display device without a viewing-angle compensating liquid crystal cell 2 (other elements being the same as those in the embodiment 11) were measured in the same manner as in the embodiment 11. The results of the measurement are shown in FIG. 23. As can be seen from FIG. 23, a display image is inevitably inverted when a viewing angle is greater than 20° in a lower half region of the diagram, i.e., in a 270°-direction. Further, a display color is changed into blue. This is significantly disadvantageous to applications in which a multi-color display is performed in combination with a color filter and like.

EMBODIMENT 12

Figure 24:
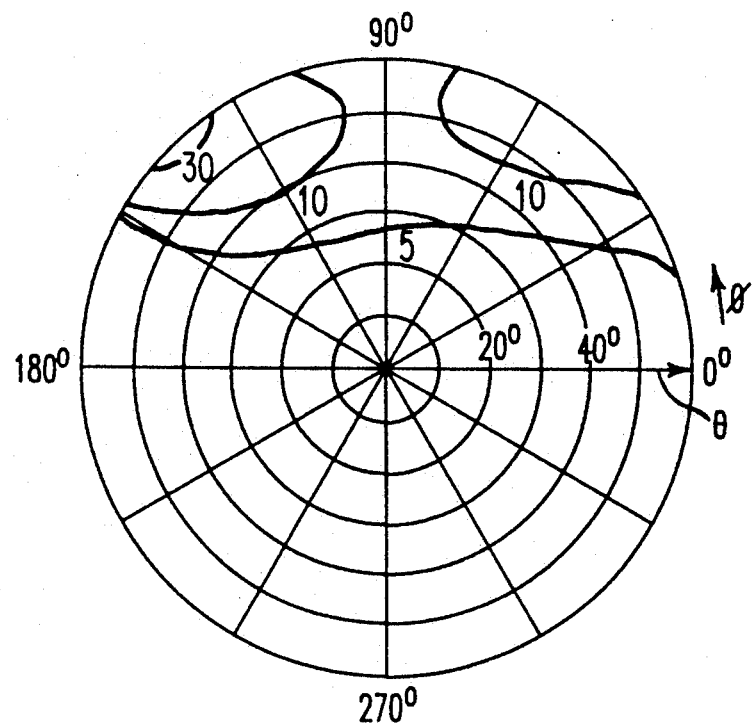
FIG. 24 is a diagram illustrating Iso-contrast characteristics for explaining advantages of an embodiment 12.

This embodiment differs from the embodiment 1 in that a viewing-angle compensating liquid crystal cell 2 is replaced with an optically anisotropic layer in the following manner. Specifically, an optically anisotropic layer was manufactured, in place of the cell 2, by use of plural sheets of films made of TAC (triacetylcellulose) having a retardation value of 0.002 μm, being deposited one after another. More specifically, 14 sheets of TAC films were deposited in such a manner that respective optical axes of the films were disposed with continuous counterclockwise deviation by every 6.5°. As a result, an optically anisotropic layer having a retardation value of 0.028 μm was obtained. Iso-contrast characteristics of a liquid crystal display device of this embodiment were measured. The results of measurement are shown in FIG. 24. As can be seen from FIG. 24, a satisfactory display image can be observed even when a viewing angle is 60° or more in a direction of 135°.

EMBODIMENT 13

A configuration of this embodiment is shown in FIG. 25. This embodiment differs from the embodiment 1 in that a direction of a rubbing axis (2.1) on an upper substrate 2a of a viewing-angle compensating liquid crystal cell 2 is reversed as compared to the direction of the rubbing axis (2.1) in the embodiment 1. A driving liquid crystal cell 3 and physical properties of the cell 2, such as a twist angle (=990°) of a liquid crystal layer, a twist direction, layer's thickness (=9 μm), a twist pitch (=3.27 μm), and refractive-index anisotropy Δn (=0.039) are all the same as those in the embodiment 1. Experimentally, a liquid crystal display device was manufactured in accordance with the above-described configuration. The Iso-contrast characteristics of this display device were measured in the same manner as in the embodiment 1. The results of the measurement are shown in FIG. 26.

Figure 26:
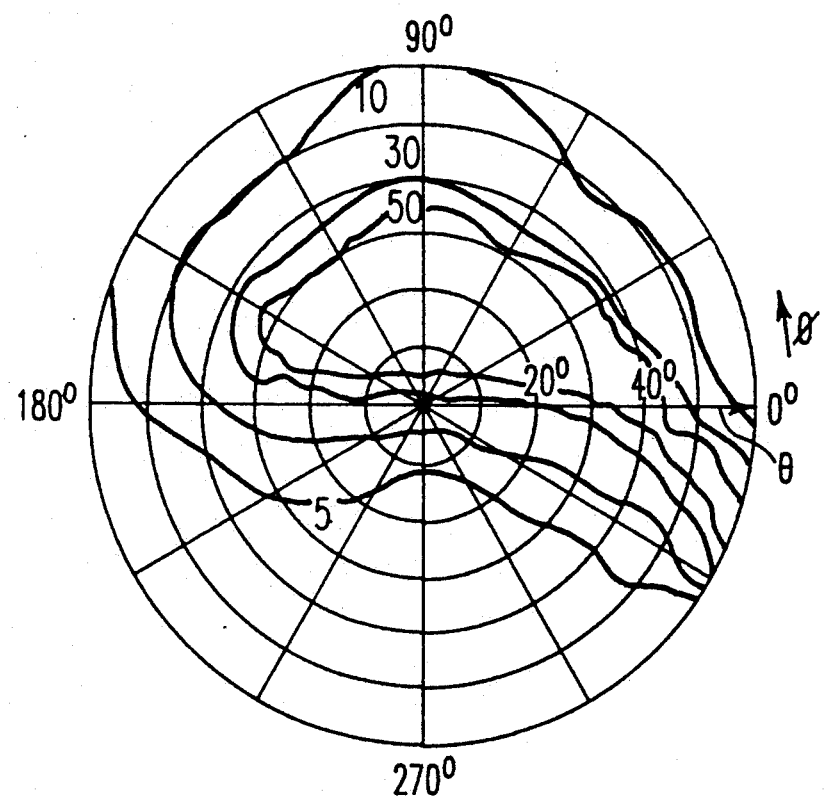
FIG. 26 is a diagram illustrating Iso-contrast characteristics for explaining advantages of the embodiment 13.

As can be seen from FIG. 26, Iso-contrast curves substantially the same as in the embodiment 1 were obtained in directions of 315°-0°-45° and 135°-180°-225°. Further, advantages better than those in the embodiment 1 were obtained in directions of 45°-90°-135°, so that a preferable viewing angle was expanded. On the other hand, a preferable viewing angle was decreased to some extent as compared to that in the embodiment 1 in directions of 225°-270°-315°. However, this decrease of preferable viewing angle was insignificant in practical applications. As described above, according to this embodiment, viewing-angle characteristics can be changed by reversing a direction of a rubbing axis of one of substrates of a viewing-angle compensating liquid crystal cell.

As described above, according to the present invention, there can be provided a liquid crystal display device in which viewing-angle characteristics have been improved. The display device of this invention can display an image of good quality with superior visibility. Further, this invention can also be applied to various active-matrix liquid crystal display devices using 3-terminal or 2-terminal elements of TFT or MIM and the like. Naturally, in these applications, the above-described significant advantages can also be obtained.

Obviously, numerous additional modifications and variations of the present invention are possible in light of the above teachings. It is therefore to be understood that within the scope of the appended claims, the invention may be practiced otherwise than as specifically described herein.

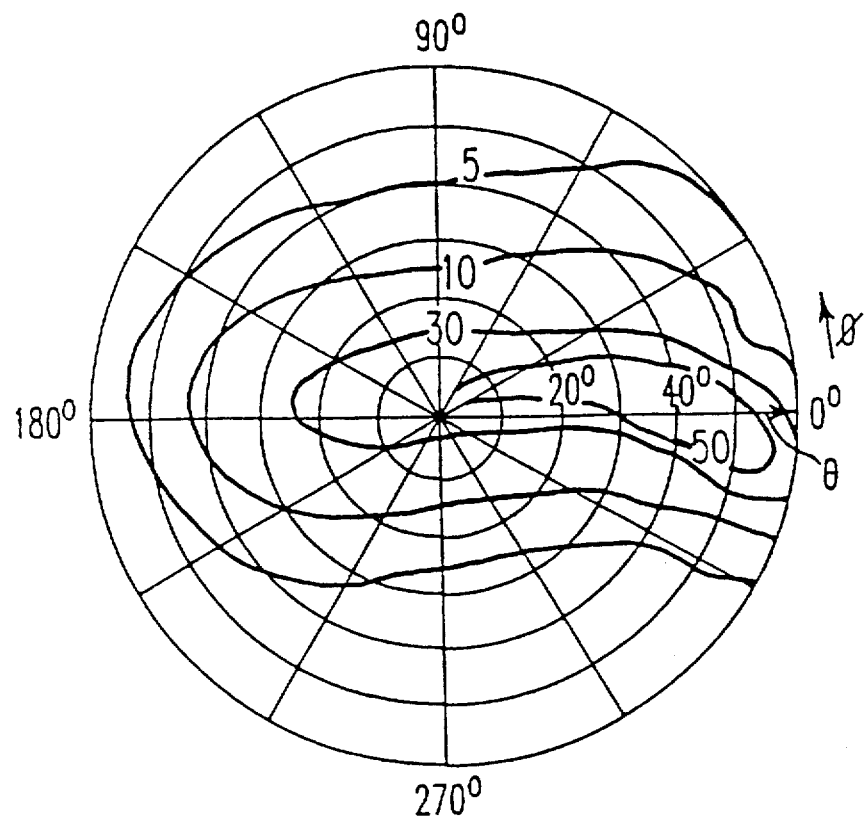
FIG. 14b
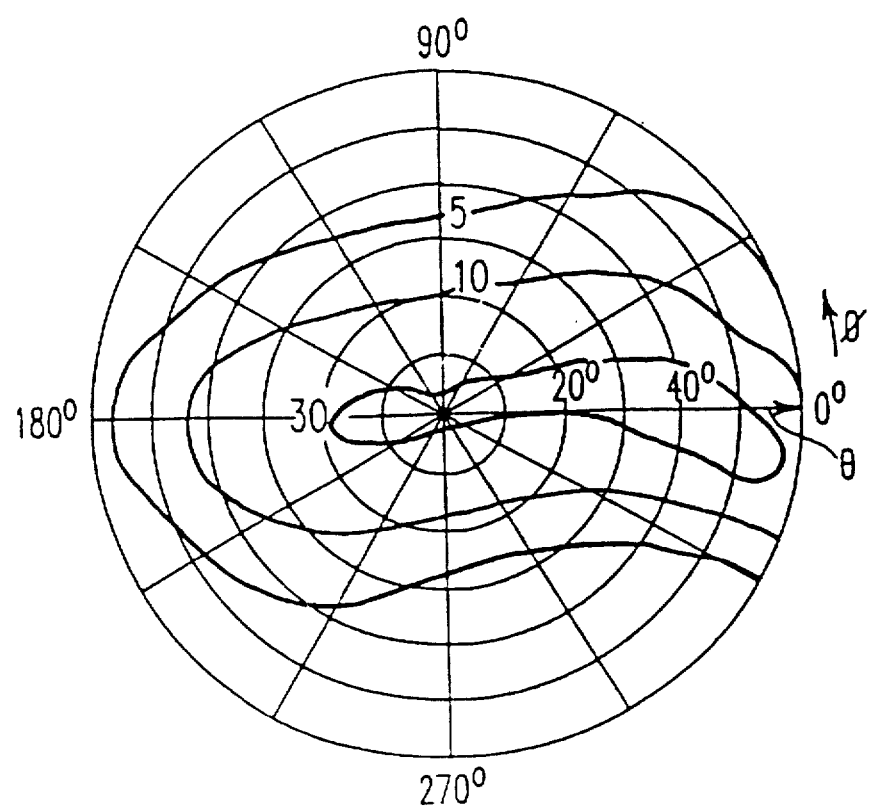

What is claimed is:

1. A liquid crystal display device comprising:
   two polarizers spaced apart from each other;
   a driving liquid crystal cell disposed between the two polarizers, the cell having two substrates with electrodes and a first liquid crystal layer sandwiched therebetween, the first liquid crystal layer forming a molecular twisted alignment with no voltage applied to the electrodes; and
   at least one optically anisotropic layer having at least one optically anisotropic media whose optical axis is continuously-twisted alignment and helical axis is substantially perpendicular to a substrate surface of the driving liquid crystal cell, the optically anisotropic layer having an optical rotary power smaller than that of the liquid crystal layer of the driving liquid crystal cell with respect to visible rays;

wherein a molecular alignment state of the first liquid crystal layer in the driving liquid crystal cell with an applied voltage greater than a prescribed threshold voltage is such that tilt angles of liquid crystal molecules differ between a center of the liquid crystal cell and areas near the two substrates and twist angles of the liquid crystal molecules are in a nonlinear fashion with respect to a thickness-direction of the first liquid crystal layer.

2. The liquid crystal display device of claim 1, wherein a retardation value $R_1$ [nm] and a twist angle $T_1$ [deg] of the driving liquid crystal cell, and a retardation value $R_2$ [nm] and a twist angle $T_2$ [deg] of the optically anisotropic layer have the following relationship:

$$(R_1/T_1) > (R_2/T_2).$$

3. The liquid crystal display device of claim 1 or claim 2, wherein a value obtained by multiplying $\Delta n$ by P is smaller than every value in a range of visible wavelengths, wherein $\Delta n$ represents refractive-index anisotropy and P represents a helical pitch, both of the optically anisotropic layer.

4. The liquid crystal display device of claim 1 or claim 2, wherein the optically anisotropic media comprises a second liquid crystal layer.

5. The liquid crystal display device of claim 1 or claim 2, wherein the optically anisotropic media comprises a polymeric liquid crystal layer.

* * * * *

UNITED STATES PATENT AND TRADEMARK OFFICE
CERTIFICATE OF CORRECTION

PATENT NO. : 5,241,408

DATED : August 31, 1993

INVENTOR(S) : Ishikawa et al

It is certified that error appears in the above-indentified patent and that said Letters Patent is hereby corrected as shown below:

In the Drawing

Sheet 10 of 22 should be deleted to appear as per attached sheet 10 of 22.

Signed and Sealed this

Twenty-sixth Day of October, 1993

Attest:

BRUCE LEHMAN

*Attesting Officer*       *Commissioner of Patents and Trademarks*